(12) United States Patent
Hansen et al.

(10) Patent No.: US 11,669,255 B2
(45) Date of Patent: Jun. 6, 2023

(54) DISTRIBUTED RESOURCE CACHING BY REALLOCATION OF STORAGE CACHING USING TOKENS AND AGENTS WITH NON-DEPLETED CACHE ALLOCATIONS

(71) Applicant: Qumulo, Inc., Seattle, WA (US)

(72) Inventors: Conner Saltiel Hansen, Portland, OR (US); Patrick Jakubowski, Seattle, WA (US); David Patrick Rogers, III, Seattle, WA (US); Thomas Gregory Rothschilds, Seattle, WA (US); Porter Michael Smith, Seattle, WA (US); Hanqing Zhang, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 17/588,120

(22) Filed: Jan. 28, 2022

(65) Prior Publication Data

US 2023/0004312 A1 Jan. 5, 2023

Related U.S. Application Data

(60) Provisional application No. 63/217,136, filed on Jun. 30, 2021.

(51) Int. Cl.
*G06F 3/06* (2006.01)
*G06F 12/0871* (2016.01)

(52) U.S. Cl.
CPC .......... *G06F 3/0631* (2013.01); *G06F 3/0604* (2013.01); *G06F 3/067* (2013.01); *G06F 3/0659* (2013.01); *G06F 12/0871* (2013.01)

(58) Field of Classification Search
CPC .... G06F 3/0631; G06F 3/0604; G06F 3/0659; G06F 3/067; G06F 12/0871
See application file for complete search history.

(56) References Cited

U.S. PATENT DOCUMENTS

| 5,165,031 A | 11/1992 | Pruul et al. |
| 5,283,875 A | 2/1994 | Gibson et al. |

(Continued)

FOREIGN PATENT DOCUMENTS

| EP | 1217551 A2 | 6/2002 |
| EP | 1498829 A1 | 1/2005 |

(Continued)

OTHER PUBLICATIONS

Office Communication for U.S. Appl. No. 16/226,587 dated Aug. 5, 2019, pp. 1-46.

(Continued)

*Primary Examiner* — Charles Rones
*Assistant Examiner* — Tong B. Vo
(74) *Attorney, Agent, or Firm* — John W. Branch; Branch Partners PLLC

(57) ABSTRACT

A file system with distributed resource caching that includes cache volumes and agents that may be associated with clients of the file system may be provided. A cache allocation for each agent may be determined based on a capacity of the cache volumes and a number of the agents such that each cache allocation is associated with tokens that each represents a reserved portion of free space in the cache volumes. Storage jobs may be provided to the agents. Data associated with the storage jobs may be stored in the cache volumes. The cache allocation for each agent may be reduced based on the data stored for each agent.

28 Claims, 14 Drawing Sheets

(56) References Cited

U.S. PATENT DOCUMENTS

| | | |
|---|---|---|
| 5,319,773 A | 6/1994 | Britton et al. |
| 5,410,684 A | 4/1995 | Ainsworth et al. |
| 5,410,719 A | 4/1995 | Shackleford |
| 5,442,561 A | 8/1995 | Yoshizawa et al. |
| 5,953,719 A | 9/1999 | Kleewein et al. |
| 6,236,996 B1 | 5/2001 | Bapat et al. |
| 6,385,641 B1 | 5/2002 | Jiang et al. |
| 6,415,283 B1 | 7/2002 | Conklin |
| 6,496,944 B1 | 12/2002 | Hsiao et al. |
| 6,529,998 B1 | 3/2003 | Yochai |
| 6,560,615 B1 | 5/2003 | Zayas et al. |
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,165,158 B1 | 1/2007 | Yagawa |
| 7,213,040 B1 | 5/2007 | Stokes et |
| 7,330,948 B2 | 2/2008 | Deguchi et al. |
| 7,467,333 B2 | 12/2008 | Keeton et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,761,456 B1 | 7/2010 | Cram et al. |
| 7,844,580 B2 | 11/2010 | Srivastava et al. |
| 7,933,870 B1 | 4/2011 | Webster |
| 7,937,421 B2 | 5/2011 | Mikesell et al. |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,341,540 B1 | 12/2012 | Haynes et al. |
| 8,355,407 B2 | 1/2013 | Wookey et al. |
| 8,364,648 B1 | 1/2013 | Sim-Tang |
| 8,423,733 B1 | 4/2013 | Ozdemir |
| 8,423,821 B1 | 4/2013 | Keith, Jr. |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Iyer et al. |
| 8,515,911 B1 | 8/2013 | Zhou et al. |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,725,691 B1 | 5/2014 | Natanzon |
| 8,776,050 B2 | 7/2014 | Plouffe et al. |
| 8,782,655 B2 | 7/2014 | Blanding et al. |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,764 B1 | 9/2014 | Long et al. |
| 8,849,809 B1 | 9/2014 | Seshadri |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,031,994 B1 | 5/2015 | Cao et al. |
| 9,032,170 B2 | 5/2015 | Vaghani et al. |
| 9,047,017 B1 | 6/2015 | Dolan et al. |
| 9,141,633 B1 | 9/2015 | Li et al. |
| 9,143,379 B1 | 9/2015 | Berger |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,361,187 B2 | 6/2016 | Jarvis |
| 9,384,252 B2 | 7/2016 | Akirav et al. |
| 9,459,804 B1 | 10/2016 | Natanzon et al. |
| 9,501,487 B1 | 11/2016 | Yuan et al. |
| 9,547,560 B1 | 1/2017 | Lee |
| 9,600,193 B2 | 3/2017 | Ahrens et al. |
| 9,727,432 B1 | 8/2017 | Cutforth et al. |
| 9,747,171 B2 | 8/2017 | Beeken et al. |
| 9,753,782 B2 | 9/2017 | Fang et al. |
| 9,753,932 B1 | 9/2017 | Brow et al. |
| 9,753,987 B1 | 9/2017 | Dolan et al. |
| 9,785,377 B2 | 10/2017 | Shin et al. |
| 9,846,698 B1 | 12/2017 | Panidis et al. |
| 10,140,185 B1 | 11/2018 | Lopez et al. |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds et al. |
| 10,339,101 B1 | 7/2019 | Gupta |
| 10,423,609 B1 | 9/2019 | Strauss |
| 10,437,509 B1 | 10/2019 | Alexeev et al. |
| 10,447,779 B2 | 10/2019 | Dieterich et al. |
| 10,474,635 B1 | 11/2019 | Unger et al. |
| 10,534,758 B1 | 1/2020 | Carpenter et al. |
| 10,540,662 B2 | 1/2020 | Barlett et al. |
| 10,545,986 B2 | 1/2020 | Tappan et al. |
| 10,621,147 B1 | 4/2020 | Liang et al. |
| 10,664,408 B1 | 5/2020 | Chatterjee et al. |
| 10,678,663 B1 | 6/2020 | Sharma et al. |
| 10,725,977 B1 | 7/2020 | Chmiel et al. |
| 10,795,796 B1 | 10/2020 | Bai et al. |
| 10,860,546 B2 | 12/2020 | Ye et al. |
| 11,023,535 B1 | 6/2021 | Greenwood et al. |
| 11,157,458 B1 | 10/2021 | Carter et al. |
| 11,265,262 B1* | 3/2022 | Makie ............... G06F 3/061 |
| 2001/0039622 A1 | 11/2001 | Hitz et al. |
| 2002/0059439 A1* | 5/2002 | Arroyo ............. H04L 47/6245 |
| | | 709/230 |
| 2002/0065835 A1 | 5/2002 | Fujisaki |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0093474 A1 | 5/2004 | Lin et al. |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114593 A1 | 5/2005 | Cassell et al. |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1 | 3/2006 | Marzinski et al. |
| 2006/0089982 A1 | 4/2006 | Abbott et al. |
| 2006/0090036 A1 | 4/2006 | Zohar et al. |
| 2006/0123005 A1 | 6/2006 | Burnett et al. |
| 2006/0173842 A1 | 8/2006 | Horvitz |
| 2006/0271604 A1 | 11/2006 | Shoens |
| 2007/0011302 A1 | 1/2007 | Groner et al. |
| 2007/0027985 A1 | 2/2007 | Ramany et al. |
| 2007/0100855 A1 | 5/2007 | T. Kohl |
| 2007/0106706 A1 | 5/2007 | Ahrens et al. |
| 2007/0118561 A1 | 5/2007 | Idicula et al. |
| 2007/0143371 A1 | 6/2007 | Kottomtharayil |
| 2008/0028006 A1 | 1/2008 | Liu et al. |
| 2008/0059399 A1 | 3/2008 | DeLorme et al. |
| 2008/0059541 A1 | 3/2008 | Fachan et al. |
| 2008/0082593 A1 | 4/2008 | Komarov et al. |
| 2008/0162608 A1 | 7/2008 | Torii et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |

(56) References Cited

U.S. PATENT DOCUMENTS

| | | |
|---|---|---|
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2009/0327642 A1 | 12/2009 | Ogihara et al. |
| 2010/0030825 A1 | 2/2010 | Matsuzawa et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev et al. |
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0179886 A1 | 7/2012 | Prahlad et al. |
| 2012/0204060 A1 | 8/2012 | Swift et al. |
| 2012/0216005 A1 | 8/2012 | Naito et al. |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0110787 A1 | 5/2013 | Garimella et al. |
| 2013/0191355 A1 | 7/2013 | Bone et al. |
| 2013/0212579 A1 | 8/2013 | Ben-Shaul et al. |
| 2013/0227236 A1 | 8/2013 | Flynn et al. |
| 2013/0254163 A1 | 9/2013 | Savage et al. |
| 2013/0268650 A1 | 10/2013 | Faitelson et al. |
| 2013/0275391 A1 | 10/2013 | Batwara et al. |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1 | 12/2013 | Bachar et al. |
| 2013/0339406 A1 | 12/2013 | Kanfi |
| 2014/0006354 A1 | 1/2014 | Parkison et al. |
| 2014/0040199 A1 | 2/2014 | Golab et al. |
| 2014/0040693 A1 | 2/2014 | Kim et al. |
| 2014/0059158 A1 | 2/2014 | Chen et al. |
| 2014/0089278 A1 | 3/2014 | Lovinger et al. |
| 2014/0089649 A1 | 3/2014 | Chaganti |
| 2014/0095249 A1 | 4/2014 | Tarakad et al. |
| 2014/0095505 A1 | 4/2014 | Blanchflower et al. |
| 2014/0095560 A1 | 4/2014 | Ikai et al. |
| 2014/0095582 A1 | 4/2014 | Eshel et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0189267 A1 | 7/2014 | Qi et al. |
| 2014/0195847 A1* | 7/2014 | Webman .............. G06F 3/067 714/6.22 |
| 2014/0237193 A1 | 8/2014 | Shivashankaraiah |
| 2014/0258609 A1 | 9/2014 | Cui et al. |
| 2014/0280485 A1 | 9/2014 | A Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0012666 A1 | 1/2015 | Pannese et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0143026 A1 | 5/2015 | Reddy et al. |
| 2015/0149736 A1 | 5/2015 | Kwon et al. |
| 2015/0186217 A1 | 7/2015 | Eslami Sarab |
| 2015/0186410 A1 | 7/2015 | Petculescu et al. |
| 2015/0186483 A1 | 7/2015 | Tappan et al. |
| 2015/0186527 A1 | 7/2015 | Rao et al. |
| 2015/0186529 A1 | 7/2015 | Rope et al. |
| 2015/0193347 A1 | 7/2015 | Kluesing et al. |
| 2015/0215405 A1 | 7/2015 | Baek et al. |
| 2015/0234716 A1 | 8/2015 | Brooker et al. |
| 2015/0234879 A1 | 8/2015 | Baldwin et al. |
| 2015/0242263 A1 | 8/2015 | Klose |
| 2015/0248253 A1 | 9/2015 | Kim et al. |
| 2015/0278282 A1 | 10/2015 | Sardina et al. |
| 2015/0310035 A1 | 10/2015 | Godman et al. |
| 2015/0347126 A1 | 12/2015 | Tibble et al. |
| 2016/0034356 A1 | 2/2016 | Aron et al. |
| 2016/0110105 A1* | 4/2016 | Karamcheti ........ G06F 12/0246 710/302 |
| 2016/0139836 A1 | 5/2016 | Nallathambi et al. |
| 2016/0147654 A1 | 5/2016 | Zhao et al. |
| 2016/0224430 A1 | 8/2016 | Long et al. |
| 2016/0239185 A1 | 8/2016 | Balimidi et al. |
| 2016/0246816 A1 | 8/2016 | Abiri et al. |
| 2016/0269501 A1 | 9/2016 | Usgaonkar et al. |
| 2016/0292013 A1 | 10/2016 | Li et al. |
| 2016/0292429 A1 | 10/2016 | Manville et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0357677 A1 | 12/2016 | Hooker et al. |
| 2016/0359859 A1 | 12/2016 | Capone |
| 2016/0371297 A1 | 12/2016 | Okun et al. |
| 2016/0380878 A1 | 12/2016 | Bugenhagen et al. |
| 2017/0024152 A1 | 1/2017 | Bhagi et al. |
| 2017/0032006 A1 | 2/2017 | Anglin et al. |
| 2017/0046143 A1 | 2/2017 | Kochhar et al. |
| 2017/0052898 A1 | 2/2017 | Ash et al. |
| 2017/0078164 A1 | 3/2017 | Hildebrand et al. |
| 2017/0091046 A1 | 3/2017 | Bangalore et al. |
| 2017/0118287 A1 | 4/2017 | Beck |
| 2017/0123883 A1 | 5/2017 | Hall |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0270180 A1 | 9/2017 | State |
| 2017/0286455 A1 | 10/2017 | Li et al. |
| 2017/0316321 A1 | 11/2017 | Whitney et al. |
| 2017/0336983 A1 | 11/2017 | Roh et al. |
| 2017/0344598 A1 | 11/2017 | Constantinescu et al. |
| 2017/0344905 A1 | 11/2017 | Hack et al. |
| 2017/0366609 A1 | 12/2017 | Dieterich et al. |
| 2018/0040029 A1 | 2/2018 | Zeng et al. |
| 2018/0059946 A1 | 3/2018 | Kunii et al. |
| 2018/0089031 A1 | 3/2018 | Mitkar et al. |
| 2018/0101546 A1 | 4/2018 | Krasnow et al. |
| 2018/0129443 A1 | 5/2018 | Karve et al. |
| 2018/0203798 A1 | 7/2018 | Hughes et al. |
| 2018/0276078 A1 | 9/2018 | Blea et al. |
| 2018/0288057 A1 | 10/2018 | Varadamma et al. |
| 2018/0314423 A1 | 11/2018 | Gong et al. |

(56) References Cited

U.S. PATENT DOCUMENTS

| | | | |
|---|---|---|---|
| 2018/0365115 | A1 | 12/2018 | Fang et al. |
| 2019/0087770 | A1 | 3/2019 | Walsh et al. |
| 2019/0095112 | A1 | 3/2019 | Lingarajappa |
| 2019/0102700 | A1 | 4/2019 | Babu et al. |
| 2019/0163589 | A1 | 5/2019 | McBride et al. |
| 2019/0163591 | A1 | 5/2019 | Ouyang et al. |
| 2019/0196879 | A1 | 6/2019 | Dutta et al. |
| 2019/0212921 | A1* | 7/2019 | Liang .................. G06F 3/0653 |
| 2019/0220189 | A1* | 7/2019 | Yang .................... G06F 3/0659 |
| 2019/0286521 | A1 | 9/2019 | Okpotse et al. |
| 2019/0286528 | A1 | 9/2019 | Wu et al. |
| 2019/0384640 | A1 | 12/2019 | Swamy et al. |
| 2020/0004977 | A1 | 1/2020 | Araujo et al. |
| 2020/0026438 | A1 | 1/2020 | Peleg et al. |
| 2020/0034077 | A1 | 1/2020 | Haravu et al. |
| 2020/0050391 | A1* | 2/2020 | Meyerowitz .......... G06F 3/0685 |
| 2020/0142878 | A1 | 5/2020 | Varadarajan et al. |
| 2020/0174692 | A1 | 6/2020 | Dave et al. |
| 2020/0242075 | A1 | 7/2020 | Davis et al. |
| 2020/0286270 | A1 | 9/2020 | Lymperopoulos et al. |
| 2020/0387315 | A1 | 12/2020 | Sterns et al. |
| 2020/0409583 | A1 | 12/2020 | Kusters et al. |
| 2021/0004355 | A1 | 1/2021 | Iwase |
| 2021/0042263 | A1 | 2/2021 | Zdornov et al. |
| 2021/0042282 | A1 | 2/2021 | Cseri et al. |
| 2021/0056074 | A1 | 2/2021 | Zhu |
| 2021/0110150 | A1 | 4/2021 | Kakrana et al. |
| 2021/0191650 | A1* | 6/2021 | Vansteenkiste ....... H04L 47/215 |
| 2021/0240393 | A1* | 8/2021 | Jo .......................... G06F 3/0604 |
| 2021/0240678 | A1 | 8/2021 | Patel et al. |
| 2021/0279187 | A1* | 9/2021 | Puder .................. G06F 13/1668 |
| 2021/0311841 | A1 | 10/2021 | McNutt |
| 2021/0374105 | A1 | 12/2021 | Kodama et al. |
| 2022/0019361 | A1 | 1/2022 | Kurata et al. |
| 2022/0066882 | A1 | 3/2022 | Wang et al. |
| 2022/0091739 | A1* | 3/2022 | Kumar .................. G06F 3/0604 |

FOREIGN PATENT DOCUMENTS

| | | |
|---|---|---|
| WO | 1999044145 A1 | 9/1999 |
| WO | 0072201 A1 | 11/2000 |
| WO | 2009007250 A2 | 1/2009 |
| WO | 2012029259 A1 | 3/2012 |

OTHER PUBLICATIONS

Office Communication for U.S. Appl. No. 16/228,716 dated Jun. 24, 2019, pp. 1-10.
Office Communication for U.S. Appl. No. 16/231,354 dated Jul. 10, 2019, pp. 1-8.
Office Communication for U.S. Appl. No. 16/262,756 dated Aug. 5, 2019, pp. 1-35.
Office Communication for U.S. Appl. No. 15/967,499 dated Jun. 27, 2018, pp. 1-16.
Office Communication for U.S. Appl. No. 16/226,587 dated Feb. 25, 2019, pp. 1-43.
Office Communication for U.S. Appl. No. 16/228,716 dated Feb. 28, 2019, pp. 1-15.
Office Communication for U.S. Appl. No. 16/231,354 dated Mar. 25, 2019, pp. 1-10.
Office Communication for U.S. Appl. No. 16/262,756 dated Apr. 2, 2019, pp. 1-29.
Office Communication for U.S. Appl. No. 16/262,790 dated Aug. 23, 2019, pp. 1-16.
Office Communication for U.S. Appl. No. 16/262,790 dated Apr. 18, 2019, pp. 1-14.
Office Communication for U.S. Appl. No. 16/262,756 dated Oct. 25, 2019, pp. 1-4.
Office Communication for U.S. Appl. No. 14/695,488 dated Dec. 30, 2019, pp. 1-6.
Office Communication for U.S. Appl. No. 14/595,598 dated Dec. 31, 2019, pp. 1-16.
Office Communication for U.S. Appl. No. 16/004,208 dated Aug. 27, 2018, pp. 1-11.
Office Communication for U.S. Appl. No. 16/234,395 dated Aug. 8, 2019, pp. 1-10.
Office Communication for U.S. Appl. No. 16/234,334 dated Apr. 5, 2019, pp. 1-15.
Office Communication for U.S. Appl. No. 16/234,395 dated Mar. 28, 2019, pp. 1-10.
Kappes, Giorgos et al., "Dike: Virtualization-aware Access Control for Multitenant Filesystems", Feb. 18, 2013, pp. 1-6.
Hitz, Dave et al., "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 15/234,334 dated Oct. 11, 2019, pp. 1-16.
Office Communication for U.S. Appl. No. 15/473,051 dated Jun. 30, 2017, pp. 1-23.
Extended European Search Report for European Patent Application No. 18155779.4 dated Apr. 17, 2018, pp. 1-15.
Office Communication for U.S. Appl. No. 16/004,182 dated Aug. 23, 2018, pp. 1-43.
Office Communication for U.S. Appl. No. 16/004,182 dated Mar. 5, 2019, pp. 1-46.
Office Communication for U.S. Appl. No. 16/004,182 dated Jul. 3, 2019, pp. 1-45.
Office Communication for U.S. Appl. No. 15/694,604 dated Jun. 3, 2019, pp. 1-8.
Office Communication for U.S. Appl. No. 16/004,182 dated May 22, 2019, pp. 1-4.
Office Communication for U.S. Appl. No. 14/595,043 dated May 4, 2017, pp. 1-30.
Office Communication for U.S. Appl. No. 14/595,043 dated Feb. 23, 2018, pp. 1-16.
Office Communication for U.S. Appl. No. 14/595,043 dated May 25, 2018, pp. 1-7.
Office Communication for U.S. Appl. No. 14/595,043 dated Oct. 5, 2018, pp. 1-17.
Office Communication for U.S. Appl. No. 14/595,043 dated Jun. 7, 2019, pp. 1-19.
Office Communication for U.S. Appl. No. 14/595,043 dated Aug. 27, 2019, pp. 1-17.
Office Communication for U.S. Appl. No. 14/658,015 dated Apr. 27, 2017, pp. 1-7.
Office Communication for U.S. Appl. No. 14/658,015 dated Jan. 4, 2018, pp. 1-28.
Office Communication for U.S. Appl. No. 14/658,015 dated Jul. 13, 2018, pp. 1-8.
Office Communication for U.S. Appl. No. 14/859,061 dated Sep. 22, 2017, pp. 1-16.
Office Communication for U.S. Appl. No. 15/831,236 dated Mar. 30, 2018, pp. 1-8.
Office Communication for U.S. Appl. No. 15/831,236 dated Aug. 15, 2018, pp. 1-14.
Office Communication for U.S. Appl. No. 14/859,114 dated Jul. 24, 2017, pp. 1-41.
Office Communication for U.S. Appl. No. 14/859,114 dated Feb. 21, 2018, pp. 1-25.
Office Communication for U.S. Appl. No. 14/859,114 dated May 11, 2018, pp. 1-5.
Office Communication for U.S. Appl. No. 14/859,114 dated Jun. 27, 2018, pp. 1-33.
Office Communication for U.S. Appl. No. 14/859,114 dated Nov. 19, 2018, pp. 1-35.
Office Communication for U.S. Appl. No. 14/859,114 dated Jan. 31, 2019, pp. 1-4.
Office Communication for U.S. Appl. No. 14/859,114 dated Mar. 7, 2019, pp. 1-32.
Office Communication for U.S. Appl. No. 14/859,114 dated Jun. 26, 2019, pp. 1-21.
Office Communication for U.S. Appl. No. 14/859,114 dated Sep. 13, 2019, pp. 1-6.
Office Communication for U.S. Appl. No. 14/859,114 dated Nov. 26, 2019, pp. 1-21.

(56) References Cited

OTHER PUBLICATIONS

Office Communication for U.S. Appl. No. 15/288,853 dated Sep. 19, 2018, pp. 1-13.
Chimera, Richard, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, pp. 1-10.
Cudre-Mauroux, Philippe et al., "TrajStore: An Adaptive Storage System for Very Large Trajectory Sets", ICDE 2010, Long Beach, CA, Mar. 1-6, 2010, pp. 109-120.
Office Communication for U.S. Appl. No. 16/436,825 dated Jul. 11, 2019, pp. 1-9.
Office Communication for U.S. Appl. No. 15/474,047 dated Sep. 18, 2017, pp. 1-14.
Office Communication for U.S. Appl. No. 15/474,047 dated Mar. 9, 2018, pp. 1-8.
Office Communication for U.S. Appl. No. 15/474,047 dated Jun. 11, 2018, pp. 1-6.
Office Communication for U.S. Appl. No. 15/474,047 dated Aug. 15, 2018, pp. 1-11.
Office Communication for U.S. Appl. No. 15/957,809 dated Jun. 28, 2018, pp. 1-27.
Office Communication for U.S. Appl. No. 15/957,809 dated Jan. 24, 2019, pp. 1-11.
Office Communication for U.S. Appl. No. 16/434,157 dated Jul. 25, 2019, pp. 1-8.
Office Communication for U.S. Appl. No. 15/854,447 dated May 6, 2019, pp. 1-9.
Office Communication for U.S. Appl. No. 16/505,562 dated Aug. 30, 2019, pp. 1-11.
Extended European Search Report for European Patent Application No. 17206518.7 dated Apr. 5, 2018, pp. 1-8.
Karatza et al., "Epoch Load Sharing in a Network of Workstations," Simulation Symposium, 2001. Proceedings. 34th Annual Apr. 22-26, 2001, Piscataway, NJ, USA, IEEE, XP010541274, ISBN: 978-0-7695-1092-7, pp. 36-42.
Office Communication for U.S. Appl. No. 16/004,182 dated Jan. 7, 2020, pp. 1-46.
Office Communication for U.S. Appl. No. 16/125,573 dated Nov. 21, 2019, pp. 1-13.
Office Communication for U.S. Appl. No. 16/226,587 dated Oct. 24, 2019, pp. 1-4.
Office Communication for U.S. Appl. No. 16/262,790 dated Dec. 12, 2019, pp. 1-10.
Office Communication for U.S. Appl. No. 16/234,334 dated Jan. 16, 2020, pp. 1-8.
Office Communication for U.S. Appl. No. 15/694,604 dated Nov. 20, 2019, pp. 1-8.
Office Communication for U.S. Appl. No. 16/262,756 dated Jan. 23, 2020, pp. 1-21.
Office Communication for U.S. Appl. No. 16/434,157 dated Jan. 29, 2020, pp. 1-9.
Office Communication for U.S. Appl. No. 16/262,790 dated Feb. 6, 2020, pp. 1-8.
Office Communication for U.S. Appl. No. 14/859,114 dated Mar. 13, 2020, pp. 1-21.
Office Communication for U.S. Appl. No. 16/752,451 dated Mar. 12, 2020, pp. 1-14.
Office Communication for U.S. Appl. No. 16/775,041 dated Mar. 11, 2020, pp. 1-8.
Office Communication for U.S. Appl. No. 16/779,362 dated Mar. 26, 2020, pp. 1-10.
Wikipedia clustered file system page from date Jul. 9, 2019, retrieved using the WayBackMachine, Prom httos://web. archive.org/web/20190709083400/https://en.wikipedia.orglvviki/Clustered_file_system (Year: 2019), pp. 1-6. 7.
Wikipedia raft p. from date Jul. 16, 2019, retrieved using the WayBackMachine, from https://web.archive.org/web/20190716115001/https://en.wikipedia.orglwiki/Raft (computer_science) (Year: 2019), pp. 1-4. — ----.
Office Communication for U.S. Patent Application No. 16/004,182 mailed Mar. 23, 2020, pp. 1-4.
Office Communication for U.S. Patent Application No. 16/752,509 mailed Apr. 2, 2020, pp. 1-8. L.
Office Communication for U.S. Appl. No. 16/152,277 dated Apr. 3, 2020, pp. 1-10.
Office Communication for U.S. Appl. No. 16/004,182 dated Apr. 28, 2020, pp. 1-51.
Office Communication for U.S. Appl. No. 16/152,259 dated Apr. 29, 2020, pp. 1-19.
Office Communication for U.S. Appl. No. 14/859,114 dated Jun. 5, 2020, pp. 1-5.
Office Communication for U.S. Appl. No. 16/262,756 dated Jun. 8, 2020, pp. 1-22.
Office Communication for U.S. Appl No. 14/595,598 dated Jul. 9, 2020, pp. 1-19.
Office Communication for U.S. Appl. No. 16/752,451 dated Jul. 23, 2020, pp. 1-8.
Office Communication for U.S. Appl. No. 14/859,114 dated Jul. 23, 2020, pp. 1-21.
Office Communication for U.S. Appl. No. 16/152,615 dated Aug. 6, 2020, pp. 1-7.
Office Communication for U.S. Appl. No. 16/779,362 dated Aug. 7, 2020, pp. 1-11.
Office Communication for U.S. Appl. No. 16/883,922 dated Aug. 7, 2020, pp. 1-13.
Office Communication for U.S. Appl. No. 16/775,041 dated Aug. 18, 2020, pp. 1-9.
Office Communication for U.S. Appl. No. 16/883,879 dated Sep. 1, 2020, pp. 1-11.
Extended European Search Report for European Patent Application No. 16812585.4 dated Nov. 7, 2018, pp. 1-9.
Comer, Douglas, "The Ubiquitous B-Tree," Computing Surveys, vol. 11, No. 2, Jun. 1979, Computer Science Department, Purdue University, West Lafayette, Indiana 47907, pp. 121-137.
Examination Report for European Patent Application No. 16812585.4 dated Jan. 2, 2020, pp. 1-6.
International Search Report and Written Opinion for International Patent Application No. PCT/US2016/038242 dated Oct. 11, 2016, pp. 1-11.
Office Communication for U.S. Appl. No. 14/595,598 dated Jul. 31, 2019, pp. 1-5.
Office Communication for U.S. Appl. No. 14/595,598 dated Sep. 20, 2018, pp. 1-18.
Office Communication for U.S. Appl. No. 14/595,598 dated Dec. 15, 2017, pp. 1-18.
Office Communication for U.S. Appl. No. 14/595,598 dated Feb. 24, 2017, pp. 1-8.
Office Communication for U.S. Appl. No. 14/595,598 dated Apr. 19, 2018, pp. 1-5.
Bloom, Burton H., "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.
Office Communication for U.S. Appl. No. 16/262,756 dated Aug. 24, 2020, pp. 1-7.
Examination Report for European Patent Application No. 18155779.4 dated Oct. 8, 2019, pp. 1-4.
Office Communication for U.S. Appl. No. 16/152,259 dated Aug. 28, 2020, pp. 1-5.
Office Communication for U.S. Appl. No. 16/752,509 dated Aug. 11, 2020, pp. 1-7.
Office Communication for U.S. Appl. No. 14/595,598 dated Sep. 25, 2020, pp. 1-7.
Office Communication for U.S. Appl. No. 16/152,277 dated Oct. 16, 2020, pp. 1-10.
Office Communication for U.S. Appl. No. 16/152,615 dated Oct. 20, 2020, pp. 1-7.

(56) References Cited

OTHER PUBLICATIONS

Office Communication for U.S. Appl. No. 16/775,041 dated Nov. 3, 2020, pp. 1-5.
Office Communication for U.S. Appl. No. 17/062,500 dated Nov. 12, 2020, pp. 1-12.
Office Communication for U.S. Appl. No. 16/004,182 dated Nov. 30, 2020, pp. 1-55.
Office Communication for U.S. Appl. No. 14/859,114 dated Dec. 1, 2020, pp. 1-24.
Office Communication for U.S. Appl. No. 16/883,922 dated Dec. 2, 2020, pp. 1-9.
Office Communication for U.S. Appl. No. 16/883,879 dated Dec. 8, 2020, pp. 1-5.
Office Communication for U.S. Appl. No. 16/152,277 dated Dec. 23, 2020, pp. 1-5.
Office Communication for U.S. Appl. No. 16/004,182 dated Jan. 28, 2021, pp. 1-4.
Office Communication for U.S. Appl. No. 14/595,598 dated Feb. 4, 2021, pp. 1-19.
Office Communication for U.S. Appl. No. 17/115,529 dated Feb. 8, 2021, pp. 1-15.
Office Communication for U.S. Appl. No. 16/262,756 dated Feb. 10, 2021, pp. 1-19.
Office Communication for U.S. Appl. No. 17/114,384 dated Feb. 17, 2021, pp. 1-12.
Examination Report for European Patent Application No. 17206518.7 dated Feb. 23, 2021, pp. 1-6.
Office Communication for U.S. Appl. No. 14/859,114 dated Mar. 8, 2021, pp. 1-4.
Office Communication for U.S. Appl. No. 16/004,182 dated Mar. 8, 2021, pp. 1-60.
Office Communication for U.S. Appl. No. 17/062,500 dated Mar. 9, 2021, pp. 1-17.
Office Communication for U.S. Appl. No. 16/152,277 dated Mar. 18, 2021, pp. 1-10.
Office Communication for U.S. Appl. No. 17/160,698 dated Mar. 18, 2021, pp. 1-11.
Office Communication for U.S. Appl. No. 17/062,500 dated May 18, 2021, pp. 1-4.
Office Communication for U.S. Appl. No. 17/203,371 dated May 20, 2021, pp. 1-10.
Office Communication for U.S. Appl. No. 17/115,529 dated May 25, 2021, pp. 1-18.
Office Communication for U.S. Appl. No. 14/859,114 dated May 26, 2021, pp. 1-11.
Office Communication for U.S. Appl. No. 16/262,756 dated May 27, 2021, pp. 1-7.
Office Communication for U.S. Appl. No. 17/114,384 dated May 27, 2021, pp. 1-13.
Office Communication for U.S. Appl. No. 17/190,653 dated May 27, 2021, pp. 1-11.
Office Communication for U.S. Appl. No. 16/741,567 dated Jun. 8, 2021, pp. 1-5.
Office Communication for U.S. Appl. No. 17/203,452 dated Jun. 23, 2021, pp. 1-11.
Office Communication for U.S. Appl. No. 16/152,277 dated Jun. 25, 2021, pp. 1-10.
Office Communication for U.S. Appl. No. 16/004,182 dated Jul. 1, 2021, pp. 1-58.
Office Communication for U.S. Appl. No. 17/160,698 dated Jul. 2, 2021, pp. 1-12.
International Search Report and Written Opinion for International Patent Application No. PCT/US2021/023531 dated Jul. 6, 2021, pp. 1-7.
Office Communication for U.S. Appl. No. 17/062,500 dated Jul. 12, 2021, pp. 1-18.
Office Communication for U.S. Appl. No. 16/775,041 dated Jul. 21, 2021, pp. 1-11.
Office Communication for U.S. Appl. No. 17/114,384 dated Aug. 3, 2021, pp. 1-4.
Office Communication for U.S. Appl. No. 14/595,598 dated Aug. 6, 2021, pp. 1-20.
Office Communication for U.S. Appl. No. 17/115,529 dated Aug. 12, 2021, pp. 1-4.
Office Communication for U.S. Appl. No. 17/190,653 dated Aug. 27, 2021, pp. 1-11.
Office Communication for U.S. Appl. No. 17/114,384 dated Sep. 2, 2021, pp. 1-5.
Office Communication for U.S. Appl. No. 16/152,277 dated Sep. 3, 2021, pp. 1-4.
Office Communication for U.S. Appl. No. 16/004,182 dated Sep. 10, 2021, pp. 1-4.
Office Communication for U.S. Appl. No. 16/004,182 dated Sep. 29, 2021, pp. 1-11.
Office Communication for U.S. Appl. No. 16/152,277 dated Oct. 18, 2021, pp. 1-5.
International Search Report and Written Opinion for International Patent Application No. PCT/US2021/023525 dated Oct. 12, 2021, pp. 1-7.
Office Communication for U.S. Appl. No. 17/115,529 dated Oct. 22, 2021, pp. 1-20.
Office Communication for U.S. Appl. No. 17/062,500 dated Oct. 27, 2021, pp. 1-17.
Office Communication for U.S. Appl. No. 14/595,598 dated Oct. 28, 2021, pp. 1-6.
Office Communication for U.S. Appl. No. 16/741,567 dated Oct. 28, 2021, pp. 1-11.
Office Communication for U.S. Appl. No. 17/203,452 dated Nov. 2, 2021, pp. 1-13.
Office Communication for U.S. Appl. No. 17/190,653 dated Nov. 10, 2021, pp. 1-6.
Office Communication for U.S. Appl. No. 17/484,167 dated Nov. 18, 2021, pp. 1-15.
Office Communication for U.S. Appl. No. 17/504,289 dated Dec. 7, 2021, pp. 1-15.
Office Communication for U.S. Appl. No. 17/114,384 dated Dec. 14, 2021, pp. 1-7.
Office Communication for U.S. Appl. No. 17/190,653 dated Dec. 21, 2021, pp. 1-12.
Office Communication for U.S. Appl. No. 17/508,869 dated Dec. 22, 2021, pp. 1-9.
Office Communication for U.S. Appl. No. 17/491,017 dated Dec. 23, 2021, pp. 1-41.
Office Communication for U.S. Appl. No. 14/595,598 dated Dec. 29, 2021, pp. 1-19.
Office Communication for U.S. Appl. No. 17/062,500 dated Jan. 7, 2022, pp. 1-4.
Office Communication for U.S. Appl. No. 16/741,567 dated Jan. 11, 2022, pp. 1-6.
Office Communication for U.S. Appl. No. 17/203,452 dated Jan. 14, 2022, pp. 1-4.
Office Communication for U.S. Appl. No. 17/510,043 dated Jan. 21, 2022, pp. 1-13.
Office Communication for U.S. Appl. No. 16/741,567 dated Feb. 7, 2022, pp. 1-8.
Office Communication for U.S. Appl. No. 17/588,895 dated Apr. 27, 2022, pp. 1-6.
Office Communication for U.S. Appl. No. 17/190,653 dated Apr. 28, 2022, pp. 1-13.
Office Communication for U.S. Appl. No. 17/510,043 dated Apr. 29, 2022, pp. 1-10.
Office Communication for U.S. Appl. No. 17/115,529 dated Apr. 29, 2022, pp. 1-4.
Office Communication for U.S. Appl. No. 17/491,017 dated May 12, 2022, pp. 1-50.
Office Communication for U.S. Appl. No. 17/484,167 dated May 17, 2022, pp. 1-3.
Office Communication for U.S. Appl. No. 17/484,167 dated Jun. 10, 2022, pp. 1-5.
Office Communication for U.S. Appl. No. 17/203,452 dated Jun. 22, 2022, pp. 1-22.
Office Communication for U.S. Appl. No. 17/530,420 dated Feb. 10, 2022, pp. 1-24.

(56) References Cited

OTHER PUBLICATIONS

Office Communication for U.S. Appl. No. 16/004,182 dated Feb. 18, 2022, pp. 1-11.
Office Communication for U.S. Appl. No. 17/115,529 dated Feb. 18, 2022, pp. 1-20.
Office Communication for U.S. Appl. No. 17/203,452 dated Feb. 24, 2022, pp. 1-14.
Office Communication for U.S. Appl. No. 17/484,167 dated Mar. 11, 2022, pp. 1-11.
Office Communication for U.S. Appl. No. 17/062,500 dated Mar. 22, 2022, pp. 1-19.
Office Communication for U.S. Appl. No. 17/504,289 dated Mar. 28, 2022, pp. 1-9.
Office Communications for U.S. Appl. No. 14/595,598 dated Jul. 13, 2022, pp. 1-9.
Office Communication for U.S. Appl. No. 17/062,500 dated Jul. 26, 2022, pp. 1-20.
Office Communication for U.S. Appl. No. 17/190,653 dated Aug. 2, 2022, pp. 1-8.
Office Communication for U.S. Appl. No. 17/115,529 dated Aug. 8, 2022, pp. 1-21.
Office Communication for U.S. Appl. No. 17/588,895 dated Aug. 12, 2022, pp. 1-12.
Office Communication for U.S. Appl. No. 17/491,017 dated Aug. 17, 2022, pp. 1-5.
Office Communication for U.S. Appl. No. 17/203,452 dated Sep. 8, 2022, pp. 1-4.
Office Communication for U.S. Appl. No. 17/491,017 dated Sep. 15, 2022, pp. 1-55.
Office Communication for U.S. Appl. No. 17/864,190 dated Sep. 19, 2022, pp. 1-10.
Office Communication for U.S. Appl. No. 17/062,500 dated Oct. 5, 2022, pp. 1-4.
Office Communication for U.S. Appl. No. 17/203,452 dated Oct. 19, 2022, pp. 1-9.
Office Communication for U.S. Appl. No. 17/203,452 dated Nov. 9, 2022, pp. 1-2.
Office Communication for U.S. Appl. No. 17/588,895 dated Nov. 9, 2022, pp. 1-11.
Office Communication for U.S. Appl. No. 17/954,640 dated Nov. 30, 2022, pp. 1-10.
Office Communication for U.S. Appl. No. 17/115,529 dated Dec. 9, 2022, pp. 1-21.
Office Communication for U.S. Appl. No. 14/595,598 dated Jul. 13, 2022, pp. 1-9.

* cited by examiner

DISTRIBUTED RESOURCE CACHING BY REALLOCATION OF STORAGE CACHING USING TOKENS AND AGENTS WITH NON-DEPLETED CACHE ALLOCATIONS

CROSS-REFERENCE TO RELATED APPLICATION

This application is a Utility patent application based on previously filed U.S. Provisional Patent Application No. 63/217,136 filed on Jun. 30, 2021, the benefit of the filing date of which is hereby claimed under 35 U.S.C. § 119(e) and the contents of which is further incorporated in entirety by reference.

TECHNICAL FIELD

The present invention relates generally to file systems, and more particularly, but not exclusively, to file system cache management in a distributed file system environment.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. Conventionally, some distributed file systems implement various caching schemes to help improve performance. However, as file systems increase in size or complexity, caching or cache management may increasingly become burdensome in terms of performance or storage requirements. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
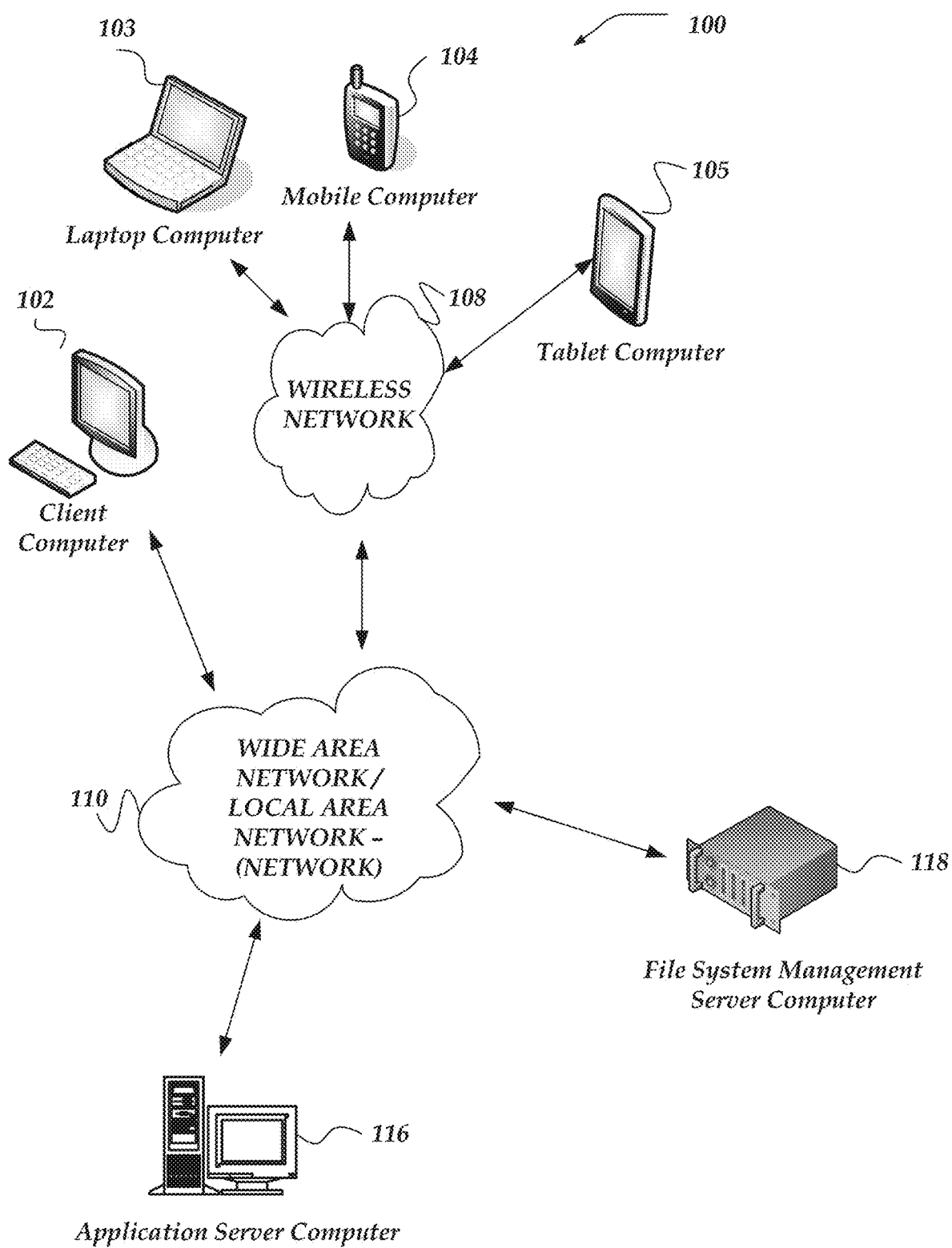
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object," or "object" refer to entities stored in a file system. These may include files, directories, or the like. In this document for brevity and clarity all objects stored in a file system may be referred to as file system objects.

As used herein the terms "block," or "file system object block" refer to the file system objects that comprise a file system object. For example, small sized file system objects, such as, directory objects or small files may be comprised of a single block. Whereas, larger file system objects, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), or the like. However, file system objects may be of various sizes, comprised of the number of blocks necessary to represent or contain the entire file system object.

As used herein, the term "agent" refers to a service, process, system, or the like, that may execute requests or jobs in a computing environment that may consume one or more distributed resources.

As used herein, the term "storage agent" refers to a service, process, system, or the like, that may execute requests or jobs in a computing environment that may consume one or more distributed storage resources including cache resources. For example, clients interacting with a file system may be storage agents or they may be associated with storage agents.

As used herein, the term "resource," "shared resource," or "distributed resource" refers to resource in a computing environment that may be available to one or more agents. For example, shared resources may include, cache storage, network bandwidth, CPU processing time, energy, or the like.

As used herein, the term "resource allocation" refers to one or more data structures that represent an amount of a resource that is reserved for use by an initiator agent.

As used herein, the term "token" refers to a countable representation of a portion of a resource. Tokens may represent a regular sized portion or proportion of a resource. For example, for a cache resource, each token may represent a portion of the cache.

As used herein, the term "cache token" refers to a countable representation of a portion of a cache volume. Cache tokens may represent a regular sized portion or proportion of the cache volume resource, such as, block, sector, or the like.

As used herein, the term "cache allocation" refers to one or more data structures that represent an amount of a cache free space that is reserved for use by a storage agent. Cache allocations may represent a number cache tokens that correspond to an amount of cache free space.

As used herein, the term "depleted cache allocation" refers to a cache allocation that represents a number of cache tokens that is less than a defined threshold value.

As used herein, the term "non-depleted cache allocation" refers to a cache allocation that represents a number of cache tokens that exceeds a defined threshold value.

As used herein the term "configuration information" refers to information that may include rule based policies, pattern matching, scripts (e.g., computer readable instructions), or the like, that may be provided from various sources, including, configuration files, databases, user input, built-in defaults, plug-ins, extensions, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to distributed resource caching. In one or more of the various embodiments, In one or more of the various embodiments, a file system that includes one or more cache volumes and one or more agents that may be associated with one or more clients of the file system may be provided.

In one or more of the various embodiments, a cache allocation for each agent may be determined based on a capacity of the one or more cache volumes and a number of the one or more agents such that each cache allocation is associated with one or more tokens that each represent a reserved portion of free space in the one or more cache volumes.

In one or more of the various embodiments, one or more storage jobs may be provided to the one or more agents.

In one or more of the various embodiments, data associated with the one or more storage jobs may be stored in the one or more cache volumes.

In one or more of the various embodiments, the cache allocation for each agent may be reduced based on the data stored for each agent.

In one or more of the various embodiments, one or more depleted cache allocations and one or more non-depleted cache allocations may be determined based on one or more allocation metrics such that each depleted cache allocation has a remaining capacity that is less than a depletion threshold and each non-depleted cache allocations has a remaining capacity that is greater than a non-depletion threshold.

In one or more of the various embodiments, in response to determining one or more depleted cached allocations, one or more portions of the one or more tokens associated with the non-depleted cache allocations may be disassociated from the non-deleted cache allocations such that the one or more portions of the one or more disassociated tokens may be associated with the one or more determined depleted cache allocations.

In one or more of the various embodiments, other data associated with one or more other jobs in the one or more depleted cache allocations may be stored in the cache volume such that the other data is stored in the portion of the one or more cache volumes previously reserved for the one or more non-depleted cache allocations.

In one or more of the various embodiments, storing the data associated with the one or more storage jobs may include: determining an agent associated with the one or more storage jobs; and in response to a capacity of the cache allocation associated with the agent being equal to or greater than an amount of data associated with the one or more storage jobs, storing the data in the one or more cache volumes and consuming a portion of the one or more tokens associated with the cache allocation of the agent based on the amount of data.

In one or more of the various embodiments, storing the data associated with the one or more storage jobs may include: determining an agent associated with the one or more storage jobs; and in response to the amount of data associated with the one or more storage jobs exceeding a capacity of the cache allocation associated with the agent, queuing the one or more storage jobs at the one or more cache volumes until additional free space is provided on the cache volume.

In one or more of the various embodiments, in response to an aggregate total of the tokens associated with the one or more cache allocations falling below a threshold value, performing further actions, including: providing a recall message to each agent associated with a cache allocation that is associated with one or more un-consumed tokens; generating a token pool at the one or more cache volumes based on a recall of the of the one or more un-consumed tokens; in response to a number of tokens in the token pool exceeding a token pool threshold value, granting a portion of the tokens in the token pool to each agent such that the cache allocation for each agent is updated based on the portion of the tokens; and in response to the number of tokens in the token pool subceeds the token pool threshold value, storing the data associated with the one or more storage jobs in the one or more cache volumes such that a portion of the one or more un-consumed tokens in the token pool are consumed based on the data associated with the one or more stored storage jobs.

In one or more of the various embodiments, one or more reclamation jobs may be executed to reclaim space on the one or more cache volumes based on moving cached data to one or more storage volumes; and in response to an amount of reclaimed spaced on the one or more cache volumes exceeding a threshold value, granting one or more other tokens associated with the reclaimed space to the one or more depleted cache allocations.

In one or more of the various embodiments, a cache upper bound for each agent may be determined based on the cache allocation for each agent. In some embodiments, a total reserved space for each agent may be determined based on one or more the cache allocation for each agent, or an amount of tokens issued from a token pool to each agent. And, in some embodiments, the one or more allocation metrics may be updated based on the cache upper bound and the total reserved space.

In one or more of the various embodiments, reducing the cache allocation for each agent based on the data stored for each agent may include: reserving space on the one or more cache volumes based on a number of tokens associated with the one or more storage jobs; and in response to storing the data on the one or more cache volumes, performing further actions, including: committing the data associated with the one or more storage jobs when the data is stored on the one or more cache volumes; and reducing the cache allocation of each agent based on the data that is committed to the one or more cache volumes.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)— (network) 110, wireless network 108, client computers 102-105, application server computer 116, file system management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by file system management server computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 116 or file system management server computer 118 are described in more detail below in conjunction with FIG. 3. Although FIG. 1 illustrates application server computer 116 and file system management server computer 118 each as a single computer, the innovations or embodiments are not so limited. For example, one or more functions of application server computer 116, file system management server computer 118, or the like, may be distributed across one or more distinct network computers. Moreover, in one or more embodiments, file system management server computer 118 may be implemented using a plurality of network computers. Further, in one or more of the various embodiments, application server computer 116, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
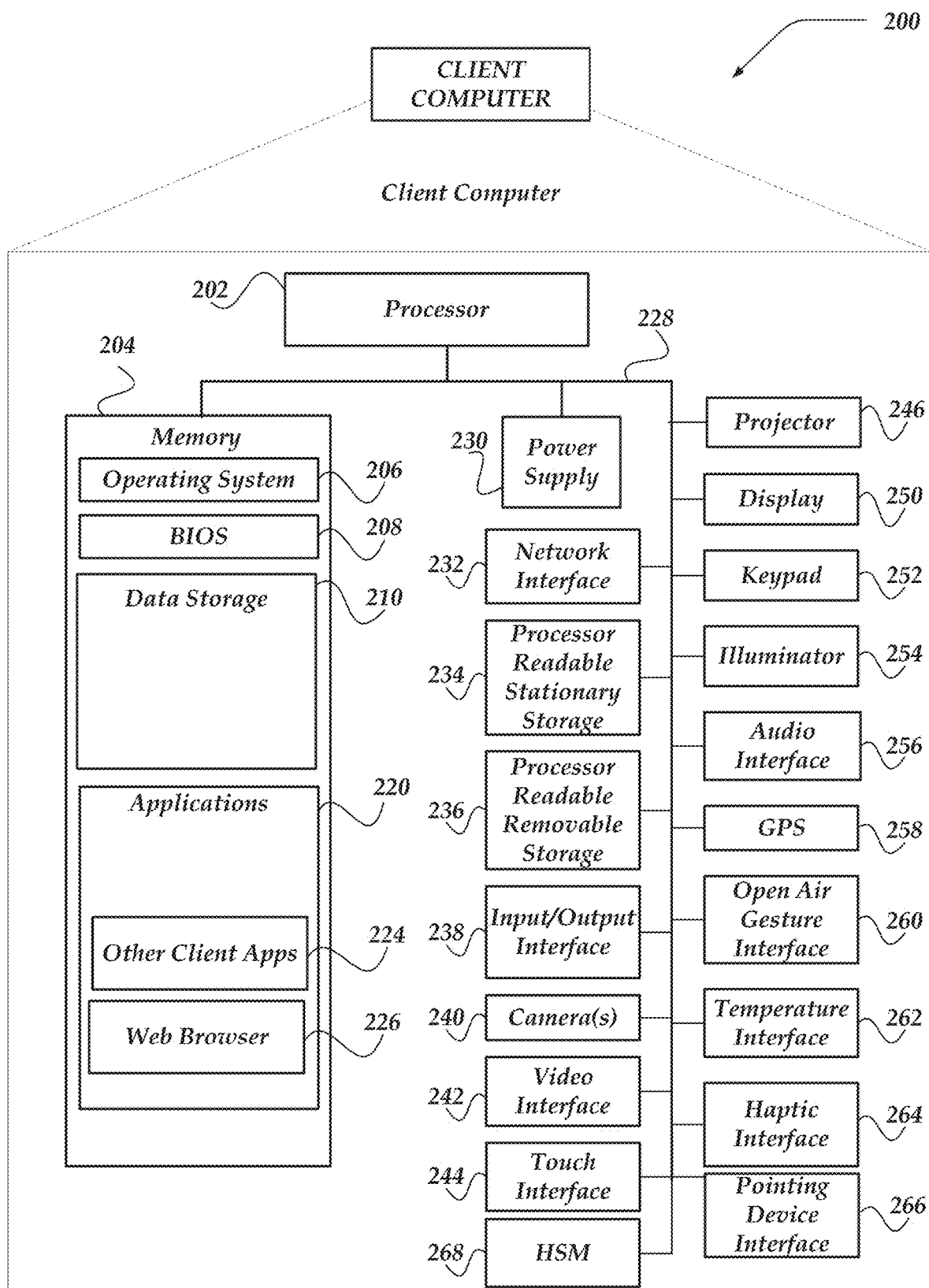
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in file system object meta-data, file system objects, file systems, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, file system operations, file system administration, file access, queries, searches, messages, notification messages, event messages, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
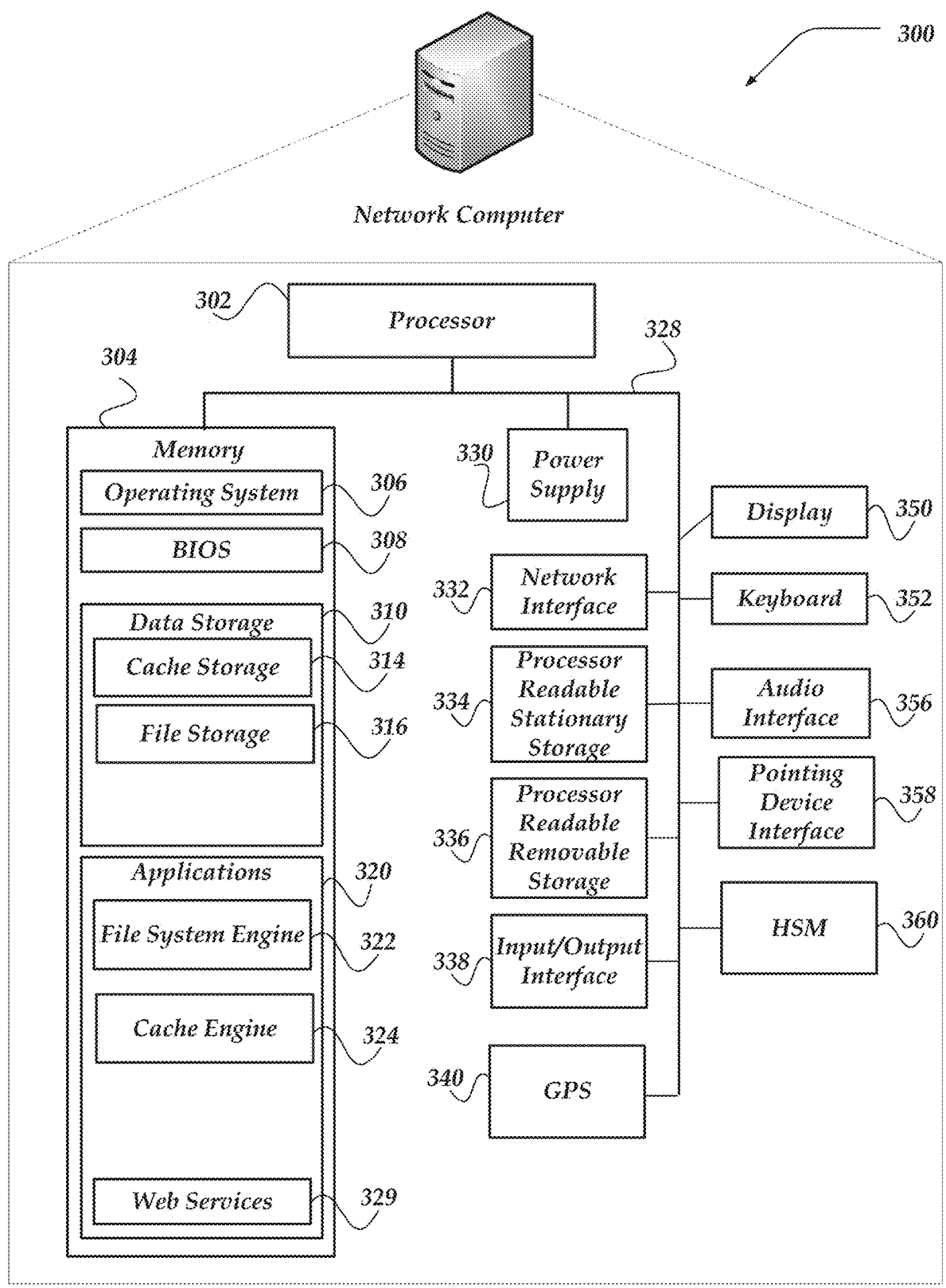
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or file system management server computer 118 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, cache engine 324, web services 329, or the like, may be arranged to employ geo-location information to select one or more localization features, such as, time zones, languages, currencies, currency formatting, calendar formatting, or the like. Localization features may be used in file system meta-data, file system objects, file systems, permissions, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data.

For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, cache storage 314, file storage 316, or the like. Cache storage 314 or file storage 316 may store files, documents, versions, properties, permissions information, file meta-data, data structures, or the like, that represent one or more portions of a distributed file system. In some embodiments, various storable objects (e.g., file system objects) may be divided into one or more blocks or pages that are stored or indexed in cache storage 314 or file storage 316. In some embodiments, cache storage 314 may comprise one or more solid state drives (SSDs) and file storage 316 may comprise one or more hard drives (HDDs).

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, cache engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, cache engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, cache engine 324, web services 329, or the like, may be provisioned and de-commissioned automatically.

Also, in one or more of the various embodiments, file system engine 322, cache engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
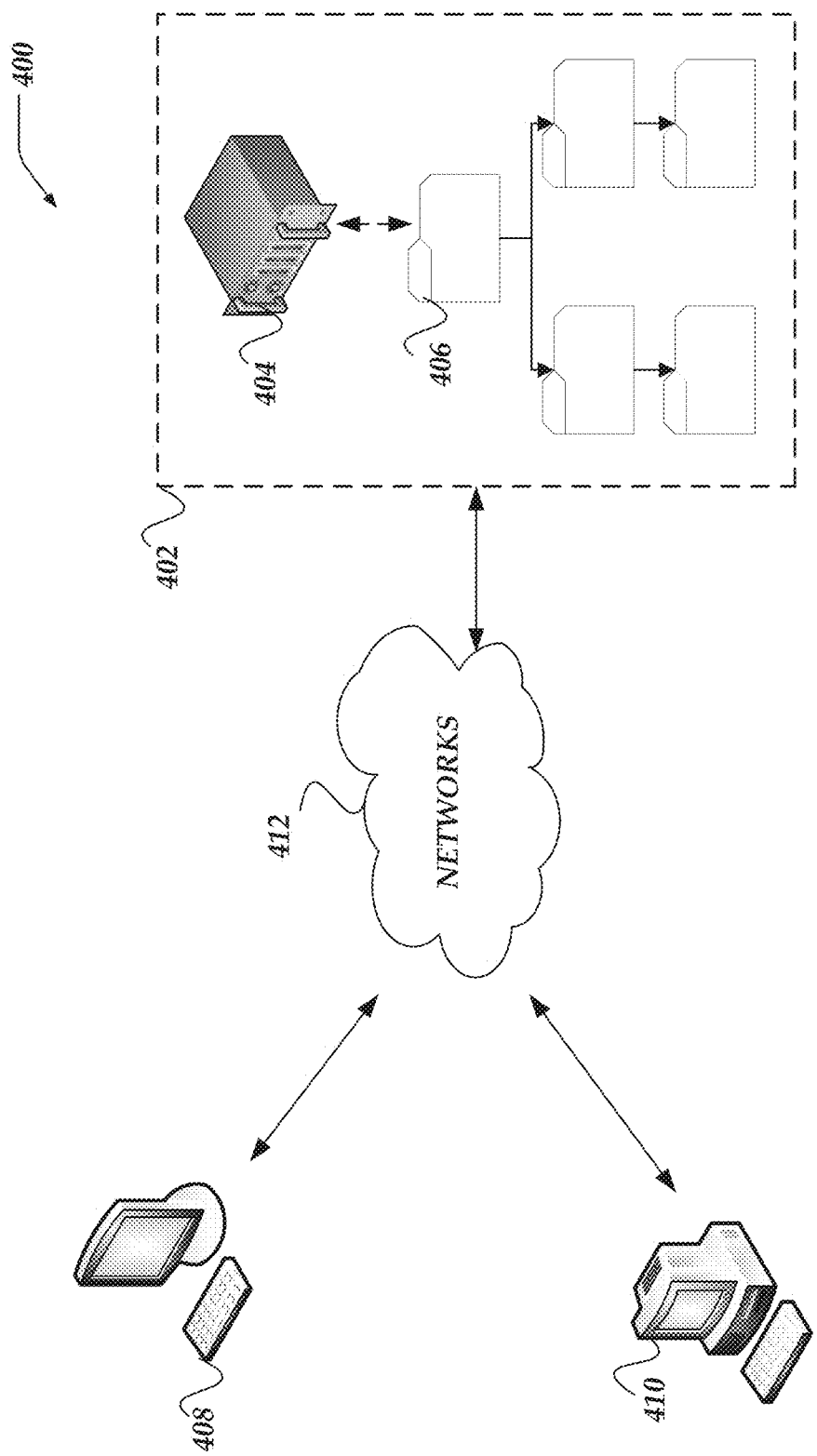
FIG. 4 illustrates a logical architecture of a system for distributed resource caching in accordance with one or more of the various embodiments.

FIG. 4 illustrates a logical architecture of system 400 for distributed resource caching in accordance with one or more of the various embodiments. In one or more of the various embodiments, file systems, such as, file system 402 may be arranged to be communicatively coupled to one or more networks, such as, networks 412. Accordingly, in one or more of the various embodiments, one or more clients, such as, client computer 408 and client computer 410 may be arranged to access file system 402 over networks 412. In some embodiments, clients of file system 402 may include users, services, programs, computers, devices, or the like, that may be enabled to perform one or more file system operations, such as, creating, reading, updating, or deleting data (e.g., file system objects) that may be stored in file system 402. In some embodiments, file system 402 may comprise one or more file system management computers, such as file system management computer 404. Also, in one or more of the various embodiments, file systems, such as file system 402 may include one or more file system objects, such as file system object 406 that may represent the various objects or entities that may be in file system 402. In some embodiments, file system objects may include, files, documents, directories, folders, change records, file system journals, backups, snapshots, replication information, versions, branches, blocks, pages, or the like. In some embodiments, primitive file system objects, such as, blocks or pages, may be used to compose more complex file system objects.

In one or more of the various embodiments, the implementation details that enable file system 402 to operate may be hidden from clients such that they may be arranged to use file system 402 the same way they use other file systems, including local file systems. Accordingly, in one or more of the various embodiments, clients may be unaware that they are using a file system that supports one or more cache tiers because file system engines or cache engines may be arranged to mimic the interface or behavior of native file systems used by the clients.

Also, while file system 402 is illustrated as using one file system management computer with one set of file system objects, the innovations described herein are not so limited. Innovations herein contemplate file systems that include one or more file system management computers or one or more file system object data stores. In some embodiments, file system object stores (e.g., file storage 316) may be located remotely from one or more file system management computers. Also, a logical file system object store or file system may be spread across two or more cloud computing environments, storage clusters, one or more on-premises servers, or the like, or combination thereof.

Figure 5:
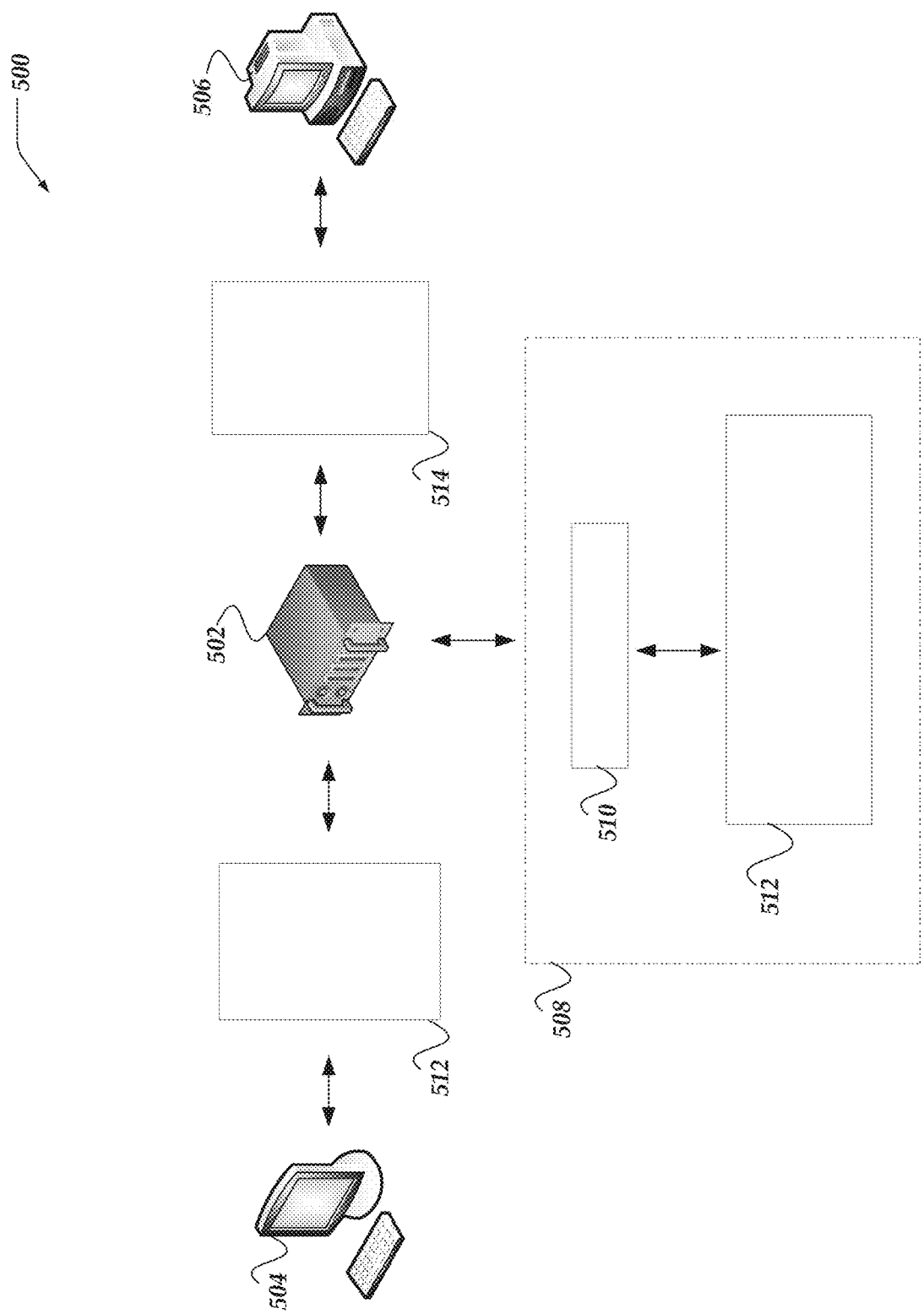
FIG. 5 illustrates a logical architecture of a file system that includes cache tiers in accordance with one or more of the various embodiments.

FIG. 5 illustrates a logical architecture of file system 500 that includes cache tiers in accordance with one or more of the various embodiments. As described above, file systems may include one or more file system management server computers, such as, file system management server computer 502. Also, in one or more of the various embodiments, one or more client computers, such as, client computer 504 and client computer 506 may access (e.g., read, write, or delete) one or more file system objects, such as, file system object 512 or file system object 514.

In one or more of the various embodiments, file system management server computers may be arranged to store or manage the storage of file system objects. In some embodiments, data storage 508 may represent one or more data storage systems or devices that may be used to store file system objects. In some embodiments, data storage 508 may include one or more cache storage tiers, such as, cache storage tier 510. Also, in some embodiments, data storage 508 may include one or more file storage tiers, such as file storage tier 512. In some embodiments, cache storage tier 510 may be comprised of storage components or resources that for one or more reasons (e.g., expense, or the like) may be considered scarcer than the storage components or resources comprising file storage tier 512. For example, in some embodiments, cache storage tier 510 may be comprised of one or more SSDs while file storage tier 512 may be comprised of one or more HDDs.

In one or more of the various embodiments, file system management server computer may be arranged to manage the distribution of file objects onto cache storage tier 510 or file storage tier 512. In some embodiments, this may include managing the demotion of file objects from cache storage to file storage or the promotion of file objects from file storage to cache storage.

Accordingly, in one or more of the various embodiments, file system management server computer may include one or more cache engines that may be instantiated to perform one or more actions to manage the promotion or demotion of file system objects to or from cache storage. In one or more of the various embodiments, cache engines may be arranged to employ one or more databases of heat extents that may be used for evaluating how to allocate cache resources of the file system.

Note, for brevity and clarity, data storage 508 is illustrated as having one cache storage tier and one file storage tier, one of ordinary skill in the art will appreciate that these innovations are not so limited. For example, in some embodiments, data storage for a file system may include two or more cache storage tiers or two or more file storage tiers. Accordingly, the innovations disclosed herein may be applied to systems having one or more cache storage tiers or one or more file storage tiers.

Figure 6:
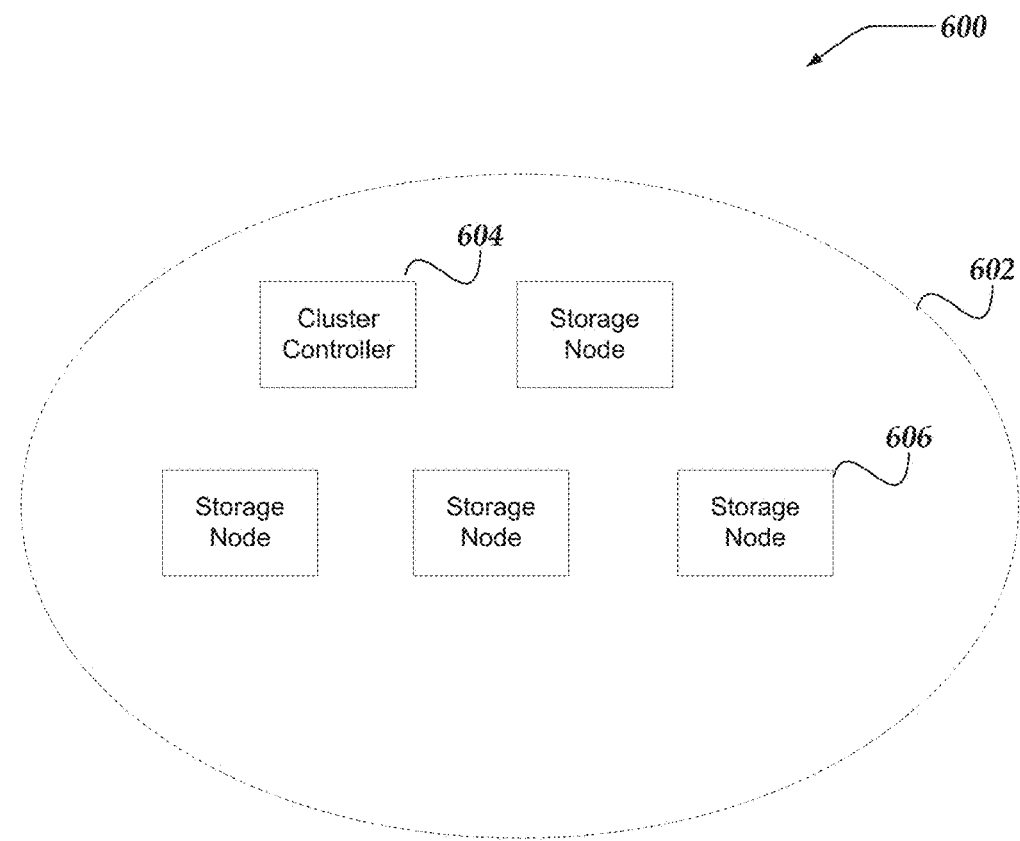
FIG. 6 illustrates a logical schematic of a cloud computing environment for distributed resource caching in accordance with one or more of the various embodiments.

FIG. 6 illustrates a logical schematic of cloud computing environment 600 for distributed resource caching in accordance with one or more of the various embodiments. As introduced above, file systems may be hosted or implemented in a cloud computing environment, such as, cloud computing environment 600.

In one or more of the various embodiments, cluster 602 may be virtualized file system cluster hosted in cloud computing environment 600. In this example, the boundary of cluster 602 is illustrated using a dashed line to represent the dynamic or elastic nature of a cloud-hosted file system cluster. Accordingly, in some embodiments, the innovations disclosed herein anticipate various conventional cloud computing features, such as, programmatically/dynamically provisioning components, such as, compute instances, storage volumes, or the like. Also, in some embodiments, innovations may rely on other programmatic/dynamic features often provided by cloud computing environments, such as, network configuration, grouping or association of various cloud environment components with other components, component/object tagging systems, component/object labeling, or the like.

In one or more of the various embodiments, file systems hosted or implemented in cloud computing environments may be assumed to provide services similar as described above for FIG. 4. Thus, for brevity or clarity those descriptions are not repeated here.

In some embodiments, cluster 602 may include one or more cluster controllers, such as, cluster leader 604 and one or more storage nodes, such as, storage node 606, or the like. In one or more of the various embodiments, cluster leader 604 may be considered to the same or similar as file system management computer 404, or the like. Also, in some embodiments, cluster leader 604 may be considered to be a storage node that is designated (or elected) to provide some or all of the same services a file system management computer may provide.

In some embodiments, storage nodes, such as, storage node 606 may be considered to be cluster nodes that may be arranged to rely on or coordinate with cluster leaders, such as, cluster leader 604.

In one or more of the various embodiments, storage nodes may be associated with one or more cache volumes or one or more storage volumes that may be based on data storage objects or storage services that may be provisioned from the cloud computing environment.

In this example, the storage volumes or cache volumes are not shown but they may be considered to be logically associated with the storage nodes.

Note, in some embodiments, cluster leaders may be storage nodes that have been selected (or elected) to provide controller services. Thus, in some embodiments, cluster leader nodes may be associated with one or more storage volumes similar as storage nodes.

Figure 7:
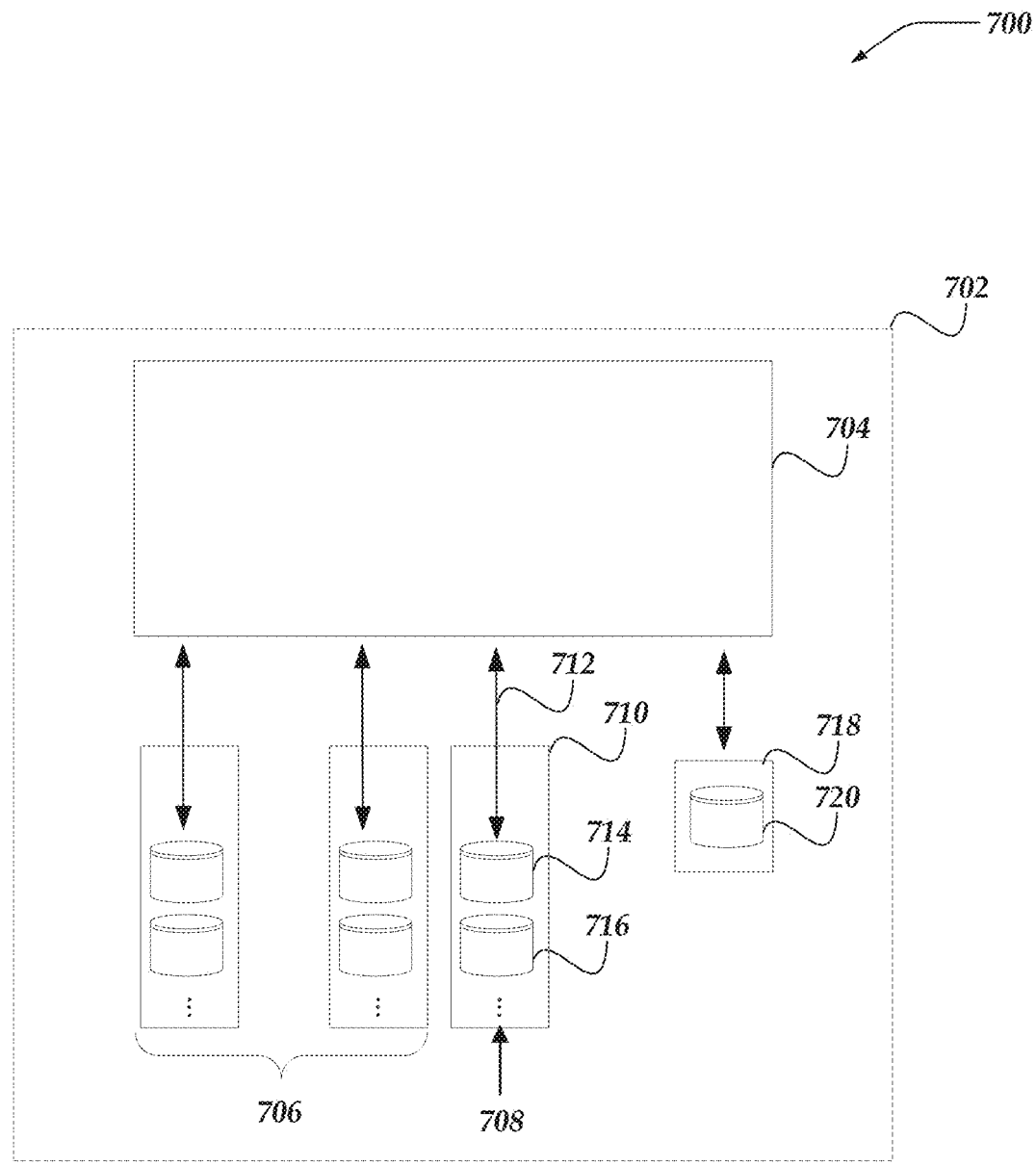
FIG. 7 illustrates a logical schematic of a cloud computing environment for distributed resource caching in accordance with one or more of the various embodiments.

FIG. 7 illustrates a logical schematic of cloud computing environment 700 for distributed resource caching in accordance with one or more of the various embodiments.

In one or more of the various embodiments, as described above, cloud computing environments may enable one or more compute instances to be employed as storage nodes of a distributed file system.

In one or more of the various embodiments, nodes in cloud computing environments may be associated with one or more storage volumes similar or analogous to how storage volume devices may be physically coupled with physical storage nodes. However, rather than being physical storage devices (hard drives, solid state drives, or the like), storage volumes for cloud storage nodes may be virtualized storage volumes that may be communicatively coupled to compute instances in the cloud computing environment.

In one or more of the various embodiments, cloud computing environments may provide configuration tools, APIs, user interfaces, or the like, that enable users to configure or select storage volumes that may have different attributes (e.g., capacity, response time, I/O performance, encryption, or the like) based on the needs of an application of user. Accordingly, storage volumes may be logically associated with compute instances in cloud computing environment to provide private or logically local storage. Thus, in some embodiments, storage volumes that are associated with a compute instance may be considered virtual storage devices.

In one or more of the various embodiments, storage nodes, such as, storage nodes 702 may be comprised compute instance 704 and one or more storage slots, such as, storage slots 606 and storage slot 708. In some embodiments, each storage slot may represent a specified amount of data storage capabilities that correspond to the storage capacity a storage node may contribute to the file system.

In one or more of the various embodiments, storage nodes may be configured to have one or more storage slots each with known attributes. In some embodiments, storage slots may be considered analogous to physical storage device slots of a physical server. For example, a physical storage node may include one or more physical hard drives that each may be installed in a physical slot of the physical storage node. However, in some embodiments, storage slots in storage nodes such as storage node 602 may be added or removed from storage nodes without physical limitations. Though, in some cases, cloud computing environments may impose restrictions related to costs, network bandwidth, capacity limitations, or the like. In cloud computing environments, in some embodiments, virtualized compute instances may be configured to have one or more storage slots that each represent or include an allocation of storage capacity in the cloud computing environment.

In one or more of the various embodiments, virtualized storage slots, such as storage slots 706 and storage slot 708 may be associated with storage volumes, such as storage volume 710. In some embodiments, storage volumes may be data structures that file system engines employ to represent or manage data storage objects provided in cloud computing environments. In some embodiments, file system engines may be arranged to employ elevator engines, or the like, manage storage volumes. In some embodiments, storage volumes in cloud computing environments may be considered abstractions that enable file system engines to rely on the same or similar actions/operations as they employ for physical storage volumes.

In one or more of the various embodiments, storage volumes, such as, storage volumes 706 or storage volume 708 may employ storage objects or storage services provided by the cloud computing environment to provide storage capacity for the virtualized storage volumes. In one or more of the various embodiments, storage objects may be interacted with via APIs or interfaces provided by the cloud computing environment.

In one or more of the various embodiments, cloud computing environments may provide a variety of different types or classes or storage objects. Including one or more storage objects that closely emulate hard disk drives. In most cases, cloud computing environment offer may provide different features or characteristics depending on the type or class of storage object, such as, interaction restrictions, performance guarantees, varied APIs, varied pricing, or the like. Thus, in some embodiments, one or more storage object types may be more or less advantageous than another depending on the local circumstances or local requirements.

Accordingly, in some embodiments, file system engines may be arranged to employ different types of storage objects depending on the circumstance. For example, performant high cost storage objects may be employed as to provide data storage for cache tiers while less performant lower cost storage objects may be employed for storage tiers. In some cases, this may be analogous to using physical SSDs for a cache tier and physical HDDs for a persistent storage layer.

In one or more of the various embodiments, storage volumes may be comprised of one or more storage objects or storage devices, such as, storage object 714, storage object 716, and so on. In some embodiments, storage objects may be mass storage objects provided by cloud computing environments. In some embodiments, cloud computing environments often provide block blobs as firstclass objects that may be instantiated, accessed, released, or the like, via one or more published APIs. Accordingly, in some embodiments, file system engines may be arranged to interact with block blobs via the APIs provided by cloud computing environments. In some embodiments, the particular APIs for interacting with storage objects or other cloud computing environment objects (e.g., compute instances, tagging systems, object querying, or the like) may be considered well known to one of ordinary skill in the art. Accordingly, in some embodiments, file system engines may be arranged to employ libraries, instructions, rules, or the like, provided via configuration information to map file system operations/actions to one or more APIs provided by cloud computing environments. In some embodiments, storage objects may be considered analogous to HDD storage in that they may be employed for persistent storage rather than cache storage. And, similar to the differences between SSD storage and HDD storage, storage object may provide slower data access than storage objects that may be used for cache tiers.

In one or more of the various embodiments, file system engines may be arranged to provide cache volumes that provide storage for cache tiers. Accordingly, in some embodiments, storage nodes may be arranged to include cache volumes, such as, cache volume 718. Similar to how storage volumes may be data structures file system engines employ to manage storage objects or storage devices, cache volumes may be data structures employed for managing page blobs that provide the storage capacity for the cache volume. For example, in analogous physical systems, SSDs may be employed as cache volumes. However, cloud-based storage nodes, such as, storage node 702 may employ cache volumes based on storage objects. Note, in some cases, cloud computing environments may provide different types of storage objects such that some are more applicable to storage volumes while others may be more applicable to cache volumes depending on the local requirements or local circumstances.

In one or more of the various embodiments, compute instances associated with storage volumes or cache volumes may be arranged to exchange messages or data using one or more data paths provided by cloud computing environments. The particular underlying implementation of data paths may vary depending on the cloud provider, however they may be generally considered logical data busses that enable compute instances to interact with storage volumes similar to interactions with physical storage devices. In this example, data path 712 represents the one or more cloud computing environment features (e.g., APIs) that enable processes hosted on compute instances to interact with storage volumes or cache volumes in cloud computing environments.

Figure 8:
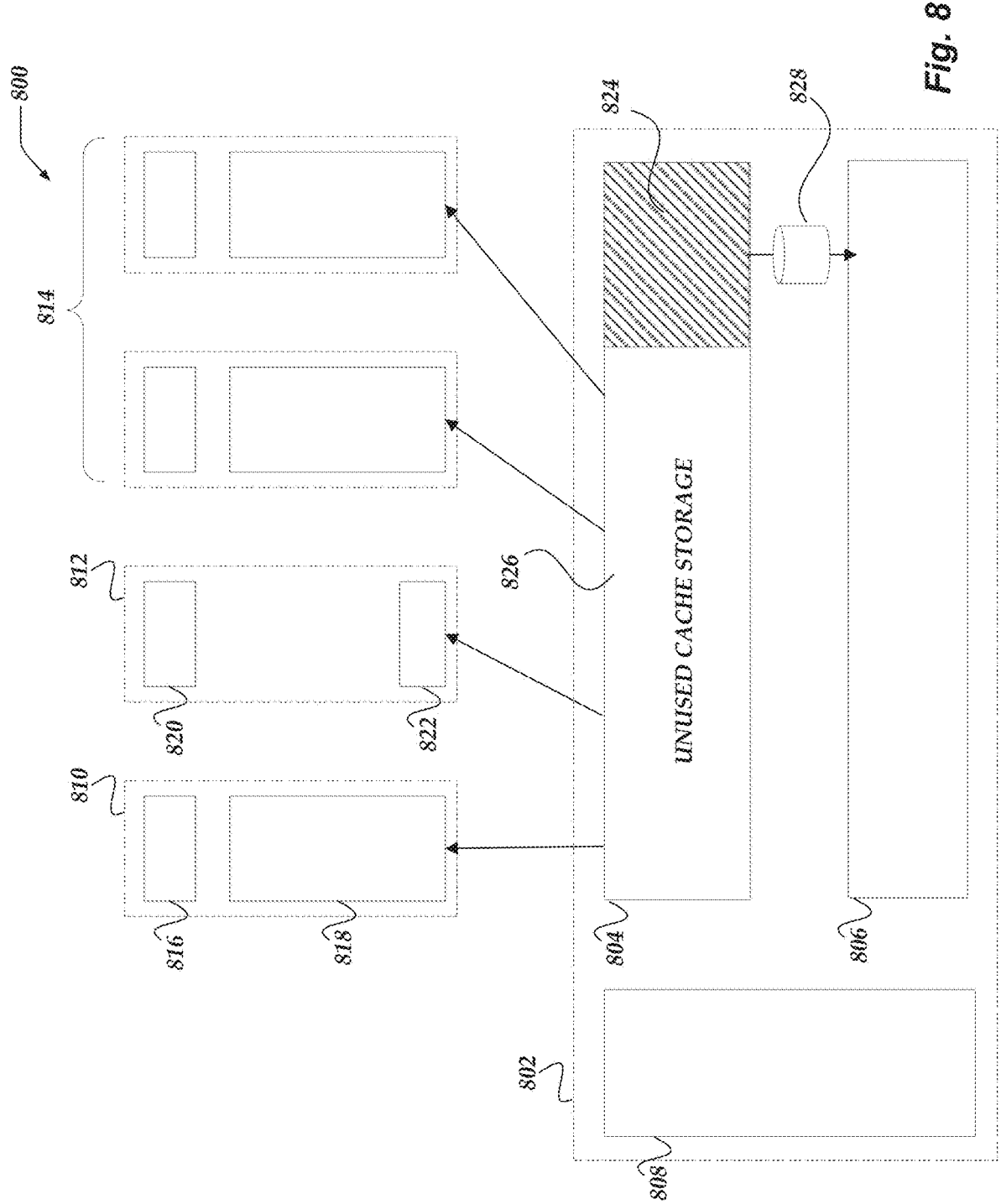
FIG. 8 illustrates a logical schematic of a portion of a file system for distributed resource caching in accordance with one or more of the various embodiments.

FIG. 8 illustrates a logical schematic of a portion of file system 800 for distributed resource caching in accordance with one or more of the various embodiments. In this example, for some embodiments, data storage system 802 may be associated with cache volume 804, storage volume 806, cache engine 808, or the like.

Accordingly, in some embodiments, various storage agents, such as, storage agent 810, storage agent 812, storage agent 814, or the like, may be associated with data storage system 802. In some embodiments, data storage system 802 may be arranged to provide data storage resources for the storage agents. In some embodiments, storage agents may be associated with instances of clients of the file system.

In some embodiments, multiple storage agents may be hosted on one or more storage nodes. Or, in some embodiments, each storage agent may correspond to one storage node. Also, in some embodiments, storage agents may be considered different processes or jobs running on the same or different storage nodes. In some embodiments, in cloud computing environments storage agents may be load balanced across one or more compute instances. Likewise, in conventional on-premises/physical deployments, one or more storage agents may be load balanced across one or more physical storage servers.

In one or more of the various embodiments, storage agents may be associated with one or more pending storage jobs associated with one or more file system transactions for one or more clients of the file system. In this example, storage agent 810 is associated with storage job 816, storage agent 812 is associated with storage job 820, and so on.

In one or more of the various embodiments, cache engines, such as, cache engine 808 may be arranged to allocate portions of cache volumes (e.g., portions of cache volume 804) to the various storage agents. In this example, for some embodiments, cache allocations, such as, cache allocation 818 or cache allocation 822 represent unused or available cache storage that is allocated to storage agent 810 and storage agent 812 respectively.

In some embodiments, cache allocations may be reduced as storage agents consumes their cache allocation. For example, cache allocation 818 for storage agent 810 is represented as being larger that cache allocation 822 for storage agent 812 to represent that storage agent 812 has consumed more of its allocated cache storage than storage agent 810.

In one or more of the various embodiments, cache allocations may be comprised of one or more tokens that each represent a portion of a cache volume. In this example, cache volume 818 may be arranged to represent tokens that correspond to an amount of storage space in the cache volume 804. Accordingly, in some embodiments, each storage agent may be arranged to track the tokens in its cache allocation to determine if data associated with transactions/jobs may be stored in a cache volume. Accordingly, in some embodiments, storage agents may be arranged to monitor the amount of cache storage available to them without referring to other storage agents or the cache engines. Thus, in some embodiments, storage agents may be informed as to whether data may be sent to cache volumes without considering storage actions associated with other storage agents. In some embodiments, keeping cache allocation information local to the storage agents may result in performance improvements at least because the local cache allocation information negates a need to request cache information from the cache engine. Accordingly, the amount of communication resources (e.g., bandwidth, messages/events, or the like) consumed by storage agents may be reduced.

In one or more of the various embodiments, if a storage agent determines that its corresponding cache allocation has been used, the storage agent may submit the relevant storage jobs directly to a storage volume, such as, storage volume 806. In contrast, for some embodiments, if tokens are available in the cache allocation, the storage agent may assume there is enough space in the cache volume to store at least an amount of data represented by its current cache allocation. For example, if cache allocation 818 represents 100 MB of storage space in cache volume 804, storage agent 810 may determine that at least a 100 MB of data may be stored in the cache volume. Note, in some embodiments, cache allocations may be data structures that track the number of tokens issued to a given storage agent.

In some embodiments, storage agents may be arranged to submit jobs to a cache engine where they may be queued until cache volume space becomes available.

In one or more of the various embodiments, cache engines may be arranged to issue an equivalent number of tokens to each storage agent such that each storage agent is allocated the same share/proportion of an underlying cache volume. For example, if a cache volume 804 is has of 1 TB of storage space available, each storage agent in system 800 may initially be issued cache tokens that represent 300 MB of storage.

In one or more of the various embodiments, as storage agents send data to cache volume 804, their cache allocation may be reduced proportionally. In this example, storage agent 812 is represented as having consumed much of its cache allocation. Accordingly, in this example, cache volume portion 824 represents a portion of cache volume 804 that is storing data which could include data stored by jobs/transactions associated with storage agent 812. Likewise, in some embodiments, cache volume portion 826 may be considered to represent available/unused storage in the cache volume.

In one or more of the various embodiments, cache engines may be arranged to initially allocate cache volumes evenly to the storage agents it supports. Accordingly, in this example, cache allocations of storage agent 810, storage agent 812, storage agents 814 correspond to cache volume portion 826. As a storage agent consumes its cache allocation, the cache allocation may be reduced to reflect the storage space in the cache volume that may be used to store the data. Thus, here cache volume portion 824 represents actual data stored in actual storage space of cache volume 804.

Accordingly, in some embodiments, if each storage agent consumes the entirety of their respective cache allocations, the cache volume may be considered full such that subsequent jobs will be prevented from using cache volume resources. Thus, such jobs may be queued until cache volume space becomes available or serviced by directly using storage volume 806.

In some cases, if one storage agent has consumed its cache allocation, other storage agents may have cache allocation remaining. Accordingly, in some embodiments, cache engines, such as, cache engine 808 may be arranged to occasionally rebalance cache allocations to avoid starving one or more storage agents of access to cache resources. Note, rebalancing cache allocations may not increase the overall amount of cache volume storage, it reallocates the remaining to the storage agents. Thus, in some embodiments, rebalancing may take tokens from those storage agents that have tokens and give them to storage agents that have consumed more of their tokens.

Accordingly, in some embodiments, a depletion threshold may be defined such that cache allocations that represent a cache free space capacity less than the depletion threshold may be considered depleted cache allocations. Likewise, in some embodiments, a non-depletion threshold may be defined such that cache allocations that represent a cache free space capacity greater than the non-depletion threshold may be considered non-depleted cache allocations. Thus, in some embodiments, cache engines may be arranged to disassociate cache tokens from non-depleted cache allocations and associate them with depleted cache allocations. In some embodiments, depletion threshold values or non-depletion threshold values may be defined based on various factors, including, cache volume capacity, transaction/job size, transaction/job rate, or the like. Also, in some embodiments, cache engines may be configured to determine depletion threshold values or non-depletion threshold values based on application type or application behavior. Accordingly, in some embodiments, cache engines may be arranged to employ rules, instructions, heuristics, or the like, provided via configuration information to account for local requirements or local circumstances.

In one or more of the various embodiments, cache engines, such as cache engine 808 may be arranged to execute one or more reclaim jobs that move data from cache volumes to storage volumes, freeing up space on the cache volumes. For example, in some embodiments, cache engine 808 may be arranged to conditionally copy data from cache volume portion to storage volume 806. Thus, in some embodiments, the cache storage freed by the reclaim jobs may be reallocated to cache allocations of storage agents.

In one or more of the various embodiments, it may be advantageous for storage agents to determine cache storage availability because it may reduce the amount administrative/control messaging that may occur. For example, in some embodiments, storage agents know if they can send data to cache storage without checking if there may be room in the cache volume. Likewise, for example, storage agents may rely on their cache allocation for this information rather having to receive constant updates from the cache engine. Accordingly, in some embodiments, a storage agent knows to send data to cache volume or storage volume without having to perform additional communication or testing. In contrast, absent innovations disclosed herein, a storage agent may send data to the cache volume to only receive negative acknowledgment if there is no space in the cache volume. In some cases, this would produce more messaging that at scale may consume a prohibitive amount of communication bandwidth that may degrade the performance of the network or the file system. Also, it would be disadvantageous to exchange messages to confirm the availability of cache storage before sending data to the cache volume. Also, in some cases, absent these innovations, a single storage agent may easily consume the entire cache volume, starving other storage agents.

In one or more of the various embodiments, cache engines may be arranged to employ queue 828 for queuing jobs or storage jobs that are not serviced by cache volume 804. Accordingly, in some embodiments, storage jobs that are not serviced by cache volumes, including cache misses, may be queued with other cache jobs that may be associated with moving data from cache volume 804 to storage volume 806.

Figure 9:
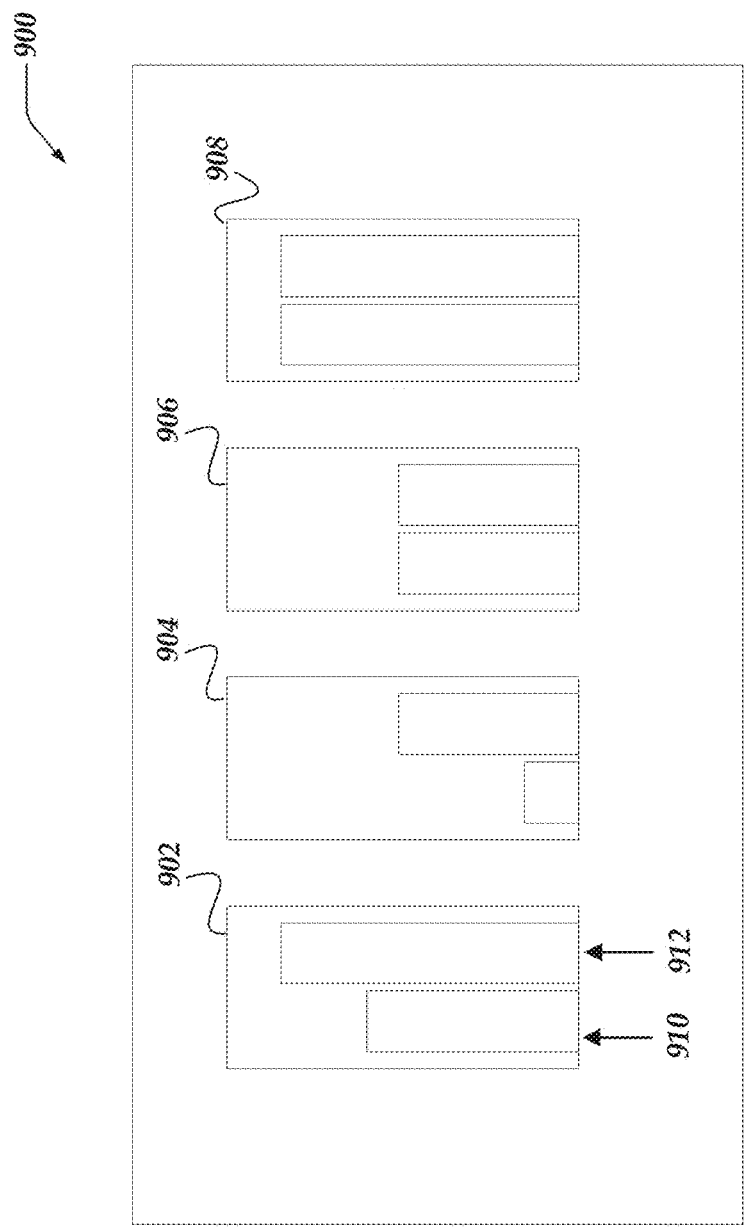
FIG. 9 illustrates a logical schematic of a portion of a file system for maintaining an account of issued cache tokens for distributed resource caching in accordance with one or more of the various embodiments.

FIG. 9 illustrates a logical schematic of a portion of file system 900 for maintain an account of issued cache tokens for distributed resource caching in accordance with one or more of the various embodiments.

In one or more of the various embodiments, file system engines running on storage nodes may be arranged to track the amount of cache tokens that may have been allocated to one or more storage agents. Accordingly, in one or more of the various embodiments, file system engines may be arranged to make determinations related to issuing cache tokens, recalling cache tokens, rebalancing cache allocations, or the like. Accordingly, in some embodiments, file system engines may be arranged to keep metrics for each storage agent that include a value representing the upper bound of the cache allocation and another value representing the total number of cache tokens that have been issued to each individual storage agent.

In this example, data structures, such as data structure 902, data structure 904, data structure 906, or data structure 908 may be employed to track allocation accounting information for storage agents. In this example, cache upper bound 910 may be considered to represent the upper bound of cache tokens issued to the storage agent that corresponds to storage agent 902. Likewise, in this example, reserved cache token count 912 may represent the total number of cache tokens used by storage agent 902.

In some cases, for some embodiments, cache upper bound count and total reserved tokens may have different values because storage jobs that miss the cache may be resolved by consuming cache tokens directly rather taking them from a cache allocation.

As storage jobs are committed, file system engines may be arranged to mark to consumed storage space as allocated and decrement the total reserved count for the storage agent based on the amount space consumed by the storage job. In some embodiments, file system engines may be arranged to update the cache upper bound to the minimum of the total reserve count and the current cache upper bound.

For example, if a storage job is unable to be fulfilled using cache space corresponding to the storage agent's cache allocation, it may be fulfilled directly from the cache volume after space in the cache volume is reclaimed or recalled. Note, in some embodiments, storage jobs queue at the cache engine if the storage agent has no cache allocation. Thus, in this case, the space in the cache volume may be used but cache tokens will not be issued to the corresponding cache allocation.

In one or more of the various embodiments, cache engines may be arranged to increment the cache upper bound count and total reserved count based each grant of cache tokens to a storage agent cache allocation. Further, in some embodiments, cache engines may be arranged to decrement cache upper bound counters if cache tokens are recalled from a storage agent. And, in some embodiments, if storage job is committed, cache engines may be arranged to decrement the total reserve count for a storage agent. In one or more of the various embodiments, cache upper bound count is determined to be the minimum of the total reserved count or cache upper bound count.

For example, for some embodiments, assume that at time 1 a storage agent has a total reserved token count of 80 and a cache upper bound count of 70. At time 2, if a commit uses 15 cache tokens, total reserved tokens may be reduced to 65 (80-15) and cache upper bound may be reduced to 65 because it is the min of (70, 65). Likewise, in this example, at time 3, if a recall request for 10 cache tokens is sent to a storage agent, the cache engine immediately decrements the cache upper bound by 10 from 65 to 55, so that the cache upper bound metric in the cache engine reflects the change immediately, so that the cache engine can use that information to make an informed choice the next time it is called. Likewise, in this example, at time 4, when the recall response returns 10 cache tokens that were previously requested to be returned, total reserved tokens for the storage agent is decremented to 55 (65−10=55). Cache upper bound remains at 55 (e.g., min(55, 55)). In some embodiments, if the cache upper bounds of one or more storage agents are zero, cache engines may be arranged to omit those storage agents from being sent recall messages. Accordingly, in some embodiments, performance may be improved by avoiding the transmission of unnecessary message. In deployments with 100s of storage agents, reducing administrative messaging may be advantageous because the amount of messaging bandwidth may be reduced and the compute resources required to process the messages at the storage agent may be reduced.

Generalized Operations

FIGS. 10-14 represent generalized operations for distributed resource caching in accordance with one or more of the various embodiments. In one or more of the various embodiments, processes 1000, 1100, 1200, 1300, and 1400 described in conjunction with FIGS. 10-14 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 10-14 may perform actions for distributed resource caching in accordance with at least one of the various embodiments or architectures such as those described in conjunction with FIGS. 4-9. Further, in one or more of the various embodiments, some or all of the actions performed by processes 1000, 1100, 1200, 1300, and 1400 may be executed in part by file system engine 322, or cache engine 324 running on one or more processors of one or more network computers.

Figure 10:
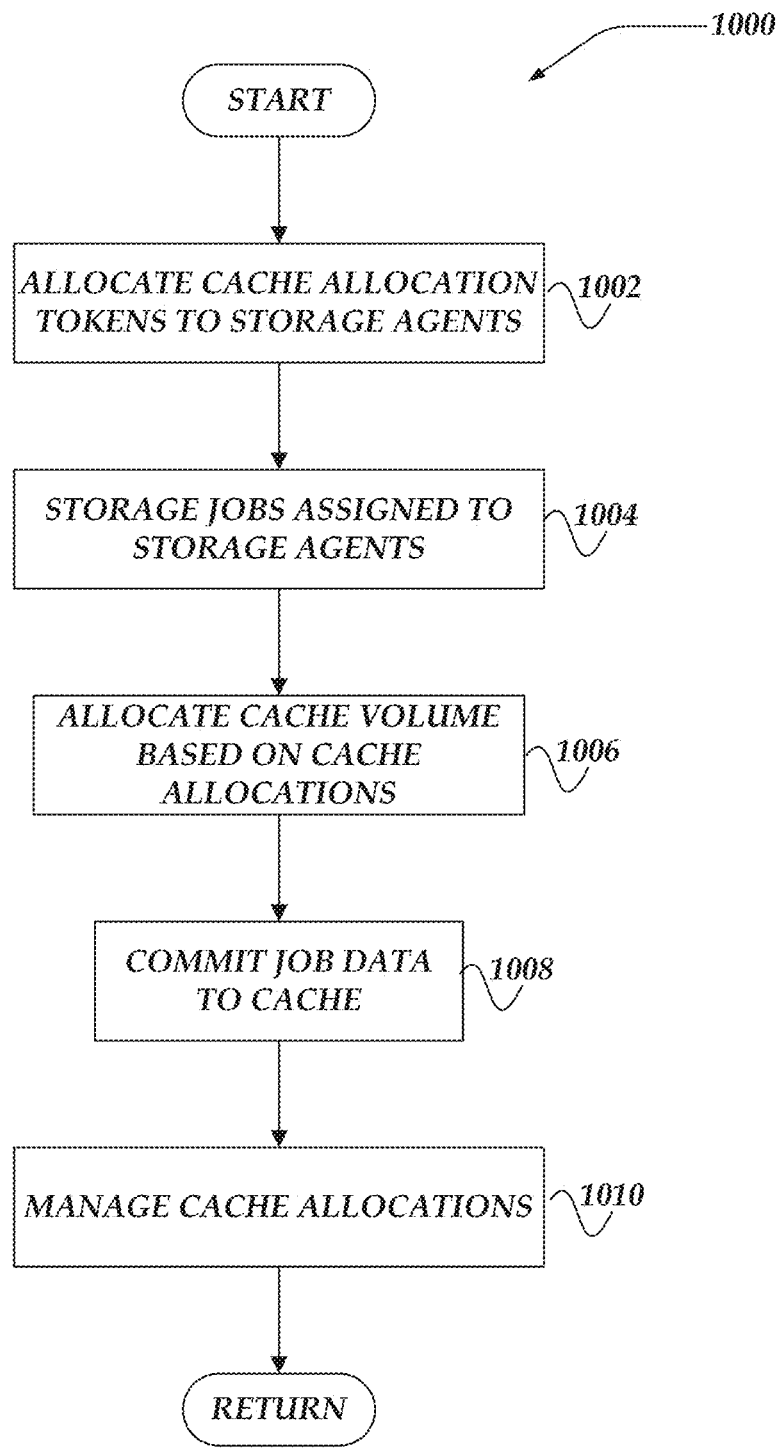
FIG. 10 illustrates an overview flowchart of a process for distributed resource caching in accordance with one or more of the various embodiments.

FIG. 10 illustrates an overview flowchart of process 1000 for distributed resource caching in accordance with one or more of the various embodiments. After a start flowchart block, at flowchart block 1002, in one or more of the various embodiments, cache engines may be arranged to allocate one or more cache tokens to one or more storage agents. In one or more of the various embodiments, cache engines may be arranged to provide a message to each storage agent that indicates the number of cache tokens that have been granted to their cache allocation.

At block 1004, in one or more of the various embodiments, one or more storage jobs may be assigned to one or more storage agents. In the normal operation of the file system, clients may submit various requests to the file system, some of which may correspond to storage jobs that may benefit from caching.

At block 1006, in one or more of the various embodiments, cache engines may be arranged to allocate cache volume space for storage jobs based on cache allocations associated with storage agents. Allocated space on the cache volume may be considered free space that is reserved for a given storage agent. Accordingly, in some embodiments, as storage agents use cache volume free space, their cache allocation may be depleted.

At block 1008, in one or more of the various embodiments, cache engines may be arranged to commit the storage jobs to a cache volume. In one or more of the various embodiments, if storage jobs are committed to the cache volume, the space used for the committed jobs is not free space so it is no longer considered part of the cache allocation for the storage agent. In some embodiments, eventually space on the cache volume may be reclaimed providing free space that may be allocated to storage agents.

At block 1010, in one or more of the various embodiments, cache engines may be arranged to manage cache allocations associated with the one or more storage agents. In one or more of the various embodiments, cache engines may be arranged to enforce one or more policies related to granting cache tokens to storage agents, rebalancing existing cache tokens, recalling cache tokens, or the like.

Next, in one or more of the various embodiments, control may be returned to a calling process.

Figure 11:
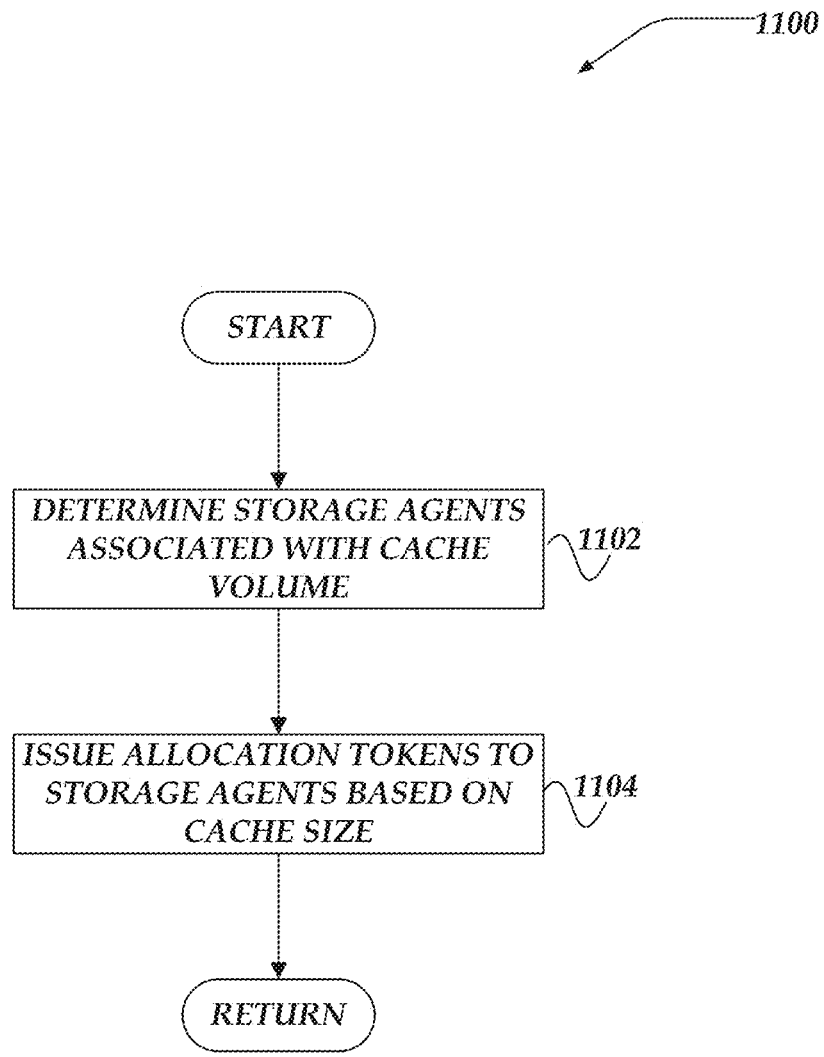
FIG. 11 illustrates a flowchart of a process for distributing cache tokens to cache allocations for distributed resource caching in accordance with one or more of the various embodiments.

FIG. 11 illustrates a flowchart of process 1100 for distributing cache tokens to cache allocations for distributed resource caching in accordance with one or more of the various embodiments. After a start flowchart block, at flowchart block 1102, in one or more of the various embodiments, cache engines may be arranged determine the number of storage agents that may be associated with a cache volume. In one or more of the various embodiments, file system engines may be configured to support one or more storage agents. In some embodiments, there may be a defined minimum number of storage agents. In some embodiments, the number of storage agents may fluctuate depending on file system policies or local conditions.

At block 1104, in one or more of the various embodiments, cache engines may be arranged to issue cache allocation tokens to each storage agent based on free space that may be available in the cache volume. In one or more of the various embodiments, cache engines may be arranged to employ various policies for determining how to allocate cache tokens to storage agents. In some embodiments, cache engines may allocate the same amount of cache tokens to each storage agent. Alternatively, in some embodiments, cache engines may be arranged to allocate some storage agents more cache tokens than other cache tokens based on a given policy. For example, in some embodiments, one or more storage agents may be dedicated to different roles or application types that may each may have different storage requirements or storage behavior. For example, storage agents that are known to benefit less from caches may be allocated fewer or none cache tokens than other storage agents the benefit more from caching.

Next, in one or more of the various embodiments, control may be returned to a calling process.

Figure 12:
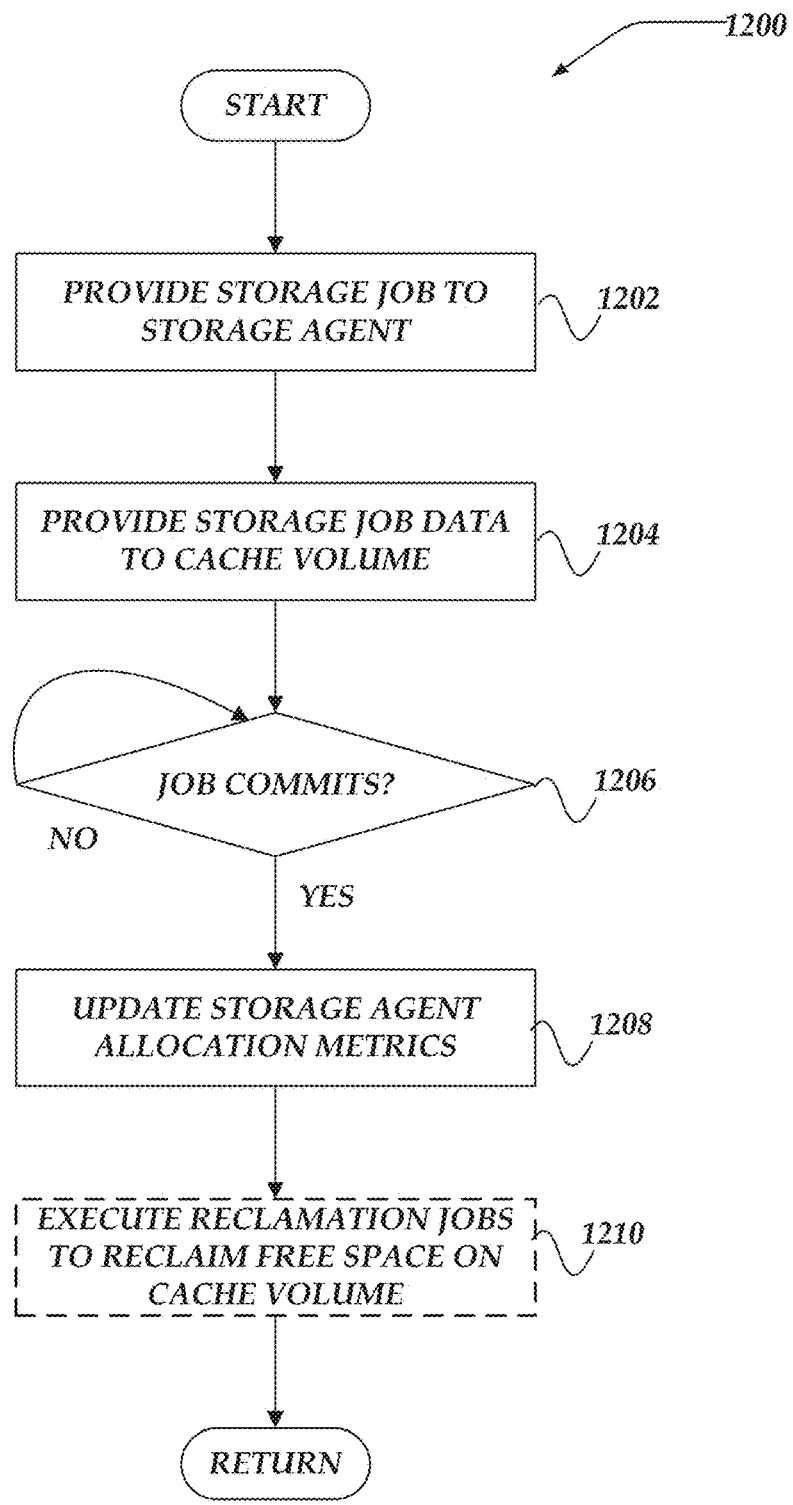
FIG. 12 illustrates a flowchart of a process for distributed resource caching in accordance with one or more of the various embodiments.

FIG. 12 illustrates a flowchart of process 1200 for distributed resource caching in accordance with one or more of the various embodiments. After a start flowchart block, at flowchart block 1202, in one or more of the various embodiments, a storage job may be provided to a storage agent. One or more clients of a file system may provide various requests to the file system for reading or writing data to the file system. Accordingly, in some embodiments, storage agents may interpret the requests to determine which storage resources are needed to service the request.

In one or more of the various embodiments, storage agents may refer to their cache allocation to determine if the cache volume has space reserved a pending storage job. For example, a storage job may be determined to require 10 cache tokens worth of free space, accordingly, if the cache allocation for the cache allocation has 10 or more cache tokens, the storage agent may be ensured that the cache volume has sufficient free space for caching the storage job.

At block 1204, in one or more of the various embodiments, the cache engine may be arranged to provide the data associated with the storage job to the cache volume.

In one or more of the various embodiments, in some cases there may not be space available in the cache volume. Accordingly, in one or more of the various embodiments, storage jobs may be queued at the cache engine until sufficient space has been reclaimed in the cache volume.

At decision block 1206, in one or more of the various embodiments, if the storage job is committed to the cache volume, control may flow to block 1208; otherwise, control may loop back to decision block 1210 until the storage job is committed.

As storage jobs are stored in the cache volume, the corresponding space in the cache volume may be considered used and unavailable until the space may be reclaimed by a reclamation job.

At block 1208, in one or more of the various embodiments, the cache engine may be arranged to update the cache allocation metrics associated with the storage agent.

In one or more of the various embodiments, cache engines may employ cache allocation metrics to determine if recalls, rebalancing, or cache token grants should occur.

In one or more of the various embodiments, if a job is committed the total reserved token count for the storage agent may be reduced based on the number of cache tokens consumed by the storage job. Note, in some embodiments, additional events, such as, cache token recalls, cache allocation rebalancing, or the like, may result in modifications/updates to the cache metrics for storage agents.

At block 1210, in one or more of the various embodiments, optionally, cache engines may be arranged to execute one or more reclamation jobs to reclaim free space for the cache volumes. In one or more of the various embodiments, cache engines may be arranged to monitor the amount of free space available in a cache volume. Accordingly, in some embodiments, if the available free space is less than a capacity threshold value, the cache engine may begin executing reclamation jobs that move data from the cache volume to a storage volume, or otherwise evict data from the cache volume to free space in the cache volume.

In some embodiments, the underlying cache eviction policy that may govern how data is evicted from a cache volume may vary and for brevity and clarity cache eviction policy is not described herein. One of ordinary skill in the art will appreciate that different eviction policies may be employed without departing from the scope of the innovations described herein.

In one or more of the various embodiments, cache engines may be arranged to grant cache tokens to one or more cache allocation as free space in the cache volume may be reclaimed. In some embodiments, cache tokens that represent reclaimed free space may be included in token pool. In some embodiments, cache engines may be arranged to grant tokens from the token pool to one or more cache allocations.

In some embodiments, granting tokens may be deferred until there are enough cache tokens to grant a minimum amount of tokens to one or more cache allocations. For example, a minimum grant size may be defined based on metrics or factors such as, average transaction/job size, cache volume, transaction/job rate, numbers or storage agents, system/network utilization, or the like. In some embodiments, the minimum grant size may be determined dynamically as the file system operates. In other embodiments, the minimum grant size may be static and sent at initialization/start-up of the file system. Accordingly, in some embodiments, cache engine may be arranged to determine grant size or other grant policies based on rules, instructions, parameter values, threshold values, or the like, provided via configuration information to account for local circumstances or local requirements.

In one or more of the various embodiments, grant policies may be configured to prioritize granting tokens to depleted cache allocations over non-depleted cache allocations. As described above, depletion thresholds or non-depletion thresholds may be employed to determine the cache allocations that are depleted and to determine the cache allocations that are considered non-depleted.

Note, this block is indicated as being optional because reclamation policy may determine if reclamation jobs may be executed.

Next, in one or more of the various embodiments, control may be returned to a calling process.

Figure 13:
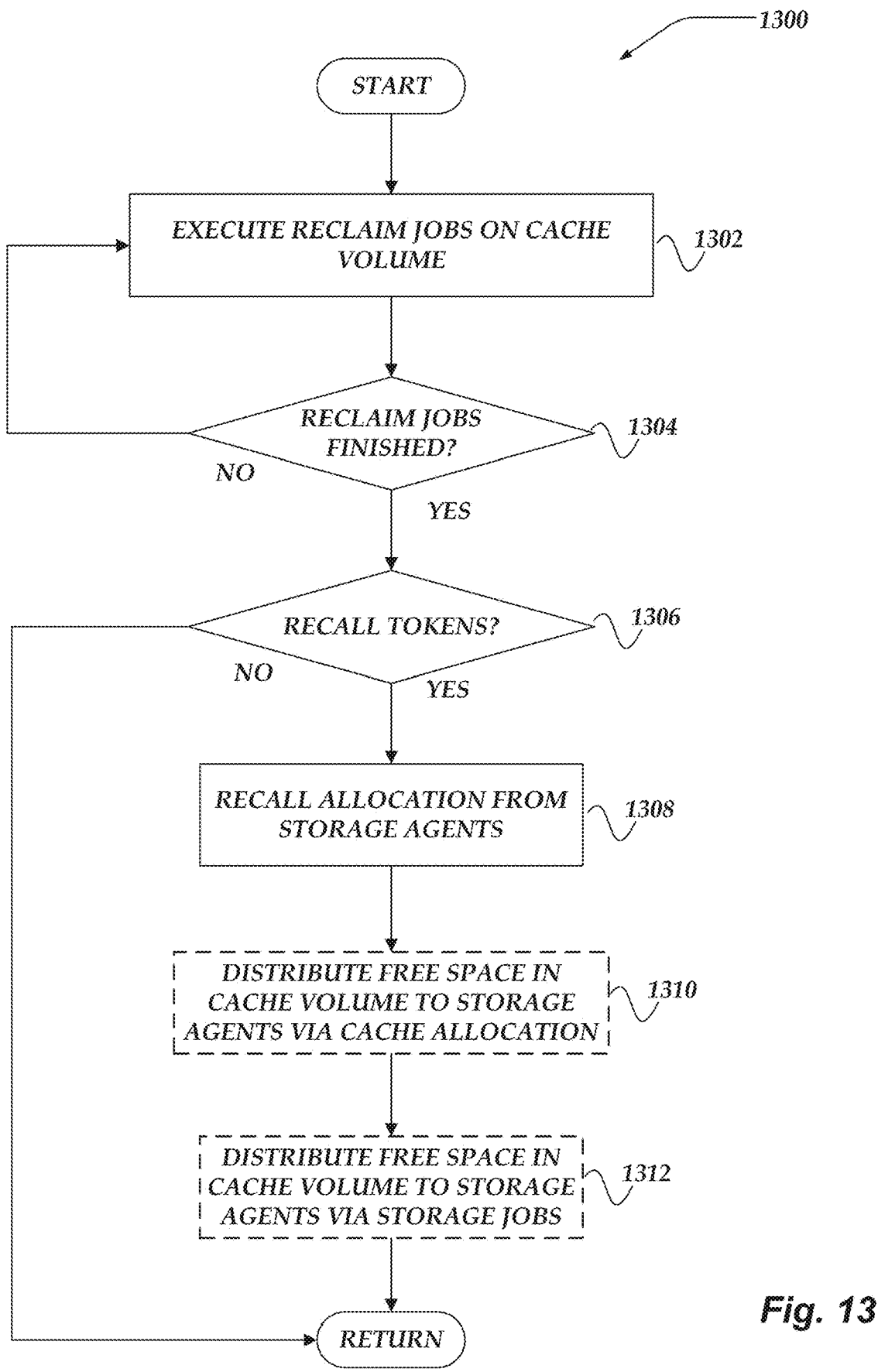
FIG. 13 illustrates a flowchart of a process for distributed resource caching in accordance with one or more of the various embodiments.

FIG. 13 illustrates a flowchart of process 1300 for distributed resource caching in accordance with one or more of the various embodiments. After a start flowchart block, at flowchart block 1302, in one or more of the various embodiments, cache engines may be arranged to execute one or more reclaim jobs for one or more cache volumes. In one or more of the various embodiments, data stored in the cache volume may eventually get stored on a storage volume. In one or more of the various embodiments, file system engines or cache engines may be arranged to apply various cache reclamation policies for selecting which data to move/evict from the cache volume. Likewise, in some embodiments, file system engines or cache engines may be arranged to apply various policies to determine the cadence or periodicity of reclaim jobs. Accordingly, in some embodiments, file system engines or cache engines may employ rules, instructions, conditions, or the like, provided by configuration information to determine the specific reclamation to execute. However, one of ordinary skill in the art will appreciate that the execution of a reclamation job will result in some amount of free space in the cache volume. For brevity and clarity details of cache policies are omitted here.

At decision block 1304, in one or more of the various embodiments, if the one or more reclaim jobs are completed, control may flow to decision block 1306; otherwise, control may loop back to block 1302.

In one or more of the various embodiments, cache engines may be arranged to prioritize the execution of reclamation jobs but there may be periods of time when there are no pending reclamation jobs. In some embodiments, cache engines may be arranged to perform rebalancing or recall operations while reclamation jobs may be idle.

As described above, cache engines or file system engines may be arranged to maintain a queue of reclamation jobs that may be monitored to determine if there may be pending reclamation jobs.

At decision block 1306, in one or more of the various embodiments, if the cache engine determines cache tokens should be recalled from cache allocations, control may flow to block 1308; otherwise, control may be returned to a calling process.

In one or more of the various embodiments, cache engines may be arranged to employ one or more rules, instructions, conditions, or the like, provided from configuration information to determine policies/conditions for determining if cache tokens should be recalled. For example, a recall may be triggered if the free space in the cache volume drops below a threshold value.

At block 1308, in one or more of the various embodiments, cache engines may be arranged to recall cache tokens from the one or more storage agents. In one or more of the various embodiments, cache engines may be arranged to send recall messages to each storage agent that is associated with a cache upper bound that may be greater than zero. In some embodiments, recall messages may include an upper bound, such as, recall up to 100 cache tokens. In other cases, for some embodiments, recall messages may request that all cache tokens be recalled.

Accordingly, in one or more of the various embodiments, storage agents may respond to recall messages and report the number of cache tokens that were returned. For example, if a storage agent has a cache allocation that includes 100 cache tokens, its response to the recall message may indicate the number of cache tokens that may now be considered recalled. Note, actual storage is not exchanged, rather a count of the allocation or reservation of tokens for each storage agent.

At block 1310, in one or more of the various embodiments, optionally, cache engines may be arranged to allocate the free space associated with the recalled cache tokens to the one or more storage agents via cache allocations.

In one or more of the various embodiments, cache engines may determine that the pool of recalled tokens is sufficient to allocate them to cache allocations of one or more storage agents. For example, for some embodiments if 1600 cache tokens are in the recall pool, a cache engine may be arranged to issue of portion of the 1600 cache tokens to each storage agent. For example, in some embodiments, if the number of cache tokens in the recall pool exceeds a threshold value, cache engines may be arranged to allocate them to storage agents. Also, in some embodiments, at or near the time of a recall, a new reclamation job may have started and finished providing additional free space that may be allocated.

For example, for some embodiments, cache allocations may be arranged to defer allocations until there is enough cache tokens to fill the cache allocation for each storage agent to a minimum amount. Accordingly, in some embodiments, recall/allocate thrashing may be reduced.

One of ordinary skill in the art will appreciate that there may be a variety of policies that may be enforced related to determining if recalled cache tokens should be reallocated to storage agent cache allocations. Accordingly, in some embodiments, cache engines may be arranged to employ rules, instructions, threshold values, policy parameters, or the like, provided via configuration information to account for local circumstances or local requirements.

Note, this block is indicated as being optional because whether recalled cache tokens are allocated to storage agents via storage jobs may depend on the current allocation policies or conditions.

At block 1312, in one or more of the various embodiments, optionally, cache engines may be arranged to allocate the free space associated with the recalled cache tokens to the one or more storage agents via storage jobs.

In one or more of the various embodiments, rather than allocating the recalled cache token pool to the cache allocations of storage agents, cache engines may allocate cache tokens on a per storage job basis as each storage job is executed. Accordingly, in one or more of the various embodiments, if a recall is executed, storage jobs may be queued at the cache engine or cache volume and cache tokens may be issued to them in turn.

Note, this block is indicated as being optional because whether recalled cache tokens are allocated to storage agents via cache allocations may depend on the current allocation policies or conditions.

Next, in one or more of the various embodiments, control may be returned to a calling process.

Figure 14:
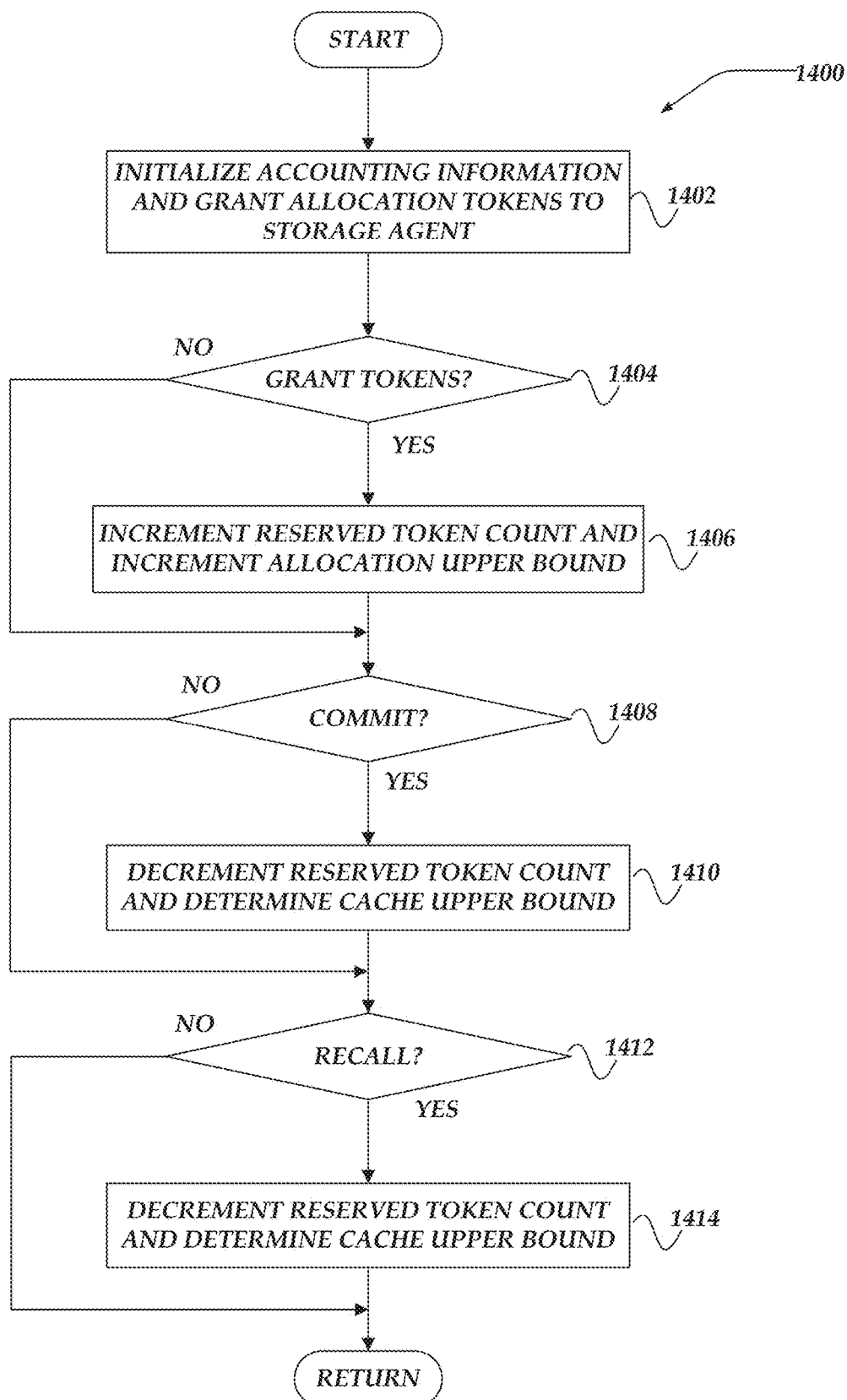
FIG. 14 illustrates a flowchart of a process for determining accounting metrics for distributed resource caching in accordance with one or more of the various embodiments.

FIG. 14 illustrates a flowchart of process 1400 for determining accounting metrics for distributed resource caching in accordance with one or more of the various embodiments. After a start flowchart block, at flowchart block 1402, in one or more of the various embodiments, cache engines may be arranged to initialize accounting information and grant allocation tokens to one or more storage agents.

In one or more of the various embodiments, accounting for cache allocation may be performed by cache engines rather than storage agents. Also, in some embodiments, to account for difference between allocated tokens represented by a storage agent's cache allocation and the actual number of tokens reserved for a storage agent, cache engine may be arranged to track at least two metrics for storage agents. One metric may be the total number of cache tokens reserved for the storage agent. In some embodiments, this metric may be a combination of cache tokens allocated to the cache allocation of a storage agent and other cache tokens that may be temporarily reserved for the storage agent.

In one or more of the various embodiments, accounting information may include a total reserved token count and a cache upper bound value. Accordingly, in some embodiments, at initialization, the reserved token count and the cache upped bound will be the same. For example, in some embodiments, if a cache engine initializes a storage agent with 1400 cache tokens, its cache upper bound will be 1400 tokens and its total reserved count will be 1400 tokens.

At decision block 1404, in one or more of the various embodiments, if a cache engine grants new cache tokens to one or more storage agents, control may flow to block 1406; otherwise, control may flow to decision block 1408.

In one or more of the various embodiments, cache engines may be arranged to conditionally/selectively grant cache token to the cache allocations of one or more storage agents. In some embodiments, granting cache tokens explicitly allocates cache tokens to the cache allocations of one or more storage agents.

In one or more of the various embodiments, cache engines may be arranged to employ one or more rules, conditions, conditions, threshold values, or the like, provided by configuration information to determine if cache token grants may occur.

In one or more of the various embodiments, granted cache tokens may come from cache volume space that has not been allocated to other storage agents. In some embodiments, the execution of reclaim jobs may be free cache storage space that may be granted to one or more storage agents. Also, in some embodiments, granted cache tokens may come from a pool of recalled cache tokens as part of a rebalancing operation.

At block 1406, in one or more of the various embodiments, cache engines may be arranged to increment the reserved token counter for the one or more storage agents and the cache upper bound based on the amount of tokens granted.

In one or more of the various embodiments, granted cache tokens are explicitly allocated to the cache allocation of the receiving storage agents. Accordingly, in some embodiments, cache engine may be arranged to increment the cache upper bound and the total reserved counter for the receiving storage agents. For example, in some embodiments, if a storage agent has a cache upper bound of 100 tokens and a total resource count of 300 tokens, granting 100 cache tokens will result in a cache upper bound of 200 cache token and a total reserve count of 400 cache tokens.

At decision block 1408, in one or more of the various embodiments, if a storage job for a storage agent is committed the cache volume, control may flow to block 1410; otherwise, control may flow to decision block 1412.

In one or more of the various embodiments, the number of cache allocations and reserved cache tokens associated with a storage agent represent empty space in the cache volume that is reserved for storing data associated for storage jobs for the storage agent. If the data is used by the storage agent (via execution of its storage jobs), the corresponding empty space is consumed and longer available for use by the storage agent.

At block 1410, in one or more of the various embodiments, cache engines may be arranged to decrement the total reserve count and determine the cache upper bound.

In one or more of the various embodiments, cache tokens reserved for a storage agent represent space on the cache volume that the storage agent is guaranteed to have available for storing data in the cache volume.

Accordingly, in some embodiments, as storage job are committed to the cache volume that space is unavailable for storing other data—either for the original storage agent or other storage agents. Thus, in some embodiments, each commit decrements the total reserve count for the storage agent. In some cases, the cache tokens used for committing the storage job may come from the cache allocation of a storage agent but in some cases, the cache tokens may be issued directly from free space in the cache volume or a pool of recall cache tokens.

In one or more of the various embodiments, cache engines may be arranged to determine the new cache upper bound by determine the minimum of the total reserved count and the current cache upper bound. For example, if the current total reserve count is 100 and the current cache upper bound is 70, committing a storage job that consumes 80 cache tokens results in a new total reserve count of 20 (100–80) and a cache upper bound of 20 (min(70, 20)). This result illustrates that a cache upper bound will not exceed a total reserve count.

At decision block 1412, in one or more of the various embodiments, if a cache engine executes a recall, control may flow to block 1414; otherwise, control may be returned to a calling process.

In some embodiments, cache engines may be arranged to selectively/conditionally recall cache tokens from storage agent cache allocations. Typically, in some embodiments, recall may be triggered if there is not enough free space in the cache volume to grant cache tokens to cache allocations. If this is the case, one or more storage agents may already have empty cache allocations.

In some embodiments, cache engines may be arranged to exclude storage agents that have cache upper bound of zero from recall messaging to reduce unnecessary message traffic. Sending recall messages to storage agents associated with zero-valued cache upper bound may be unnecessary because such storage agents do not have any cache token to be recalled.

In one or more of the various embodiments, cache engines may be arranged to send recall messages to storage agent that result is tokens from their cache allocations being recalled to the cache engine. In one or more of the various embodiments, cache engines may be arranged to issued recall messages if one or more cache allocations for storage agents fall below a defined threshold value.

At block 1414, in one or more of the various embodiments, cache engines may be arranged to decrement the total reserved count and determine the cache upper bound value.

In some embodiments, cache engines may be decrement number of cache token recalled from the total reserved count. Then the new cache upper bound may be determined to be the minimum of the 'old' cache upper bound and the new total reserved count.

For example, if a storage agent has a total reserved count of 100 and a cache upper bound of 100, a complete recall will result in a new total reserved count of 0 and a cache upper bound of 0.

Also, for example, if the storage agent has a total reserved count of 120 and a cache upper bound of 100, a 100 cache token recall will result in a new total reserved count of 20 (120–100) and a cache upper bound of 0 (100–100). The cache engine can decrement the cache upper bound by 100 because a recall is always for tokens in the cache.

Also, for example, if the storage agent has a total reserved count of 120 and a cache upper bound of 10, a 100 cache token recall will result in a new total reserved count of 20 and a cache upper bound of 10.

As described above, having a total reserved count that is greater than cache upper bound may occur because a storage agent has been issued cache tokens when the storage job is at the cache engine. Further, in some embodiments, a cache engine may be arranged to provide a recall response that supplies less cache tokens than requested. In some embodiments, this may happen if more than one storage job for the same storage agent may be running concurrently with a recall request, and one or more of the concurrent storage jobs consumed cache allocation between the time when the cache engine sent the recall message and the storage agent received the recall message. In this case, if the cache engine receives the recall response, the cache engine decrements the total reserved count by the actual number of cache tokens returned instead of by the number requested.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors that execute instructions to perform actions, comprising:
   providing the file system that includes one or more cache volumes and one or more agents that are associated with one or more clients of the file system;
   determining a cache allocation for each of the agents based on a capacity of the one or more cache volumes and a number of the one or more agents, wherein each of the cache allocations is associated with one or more tokens that each of the cache allocations represents a reserved portion of free space in the one or more cache volumes, and wherein distribution of each of the cache allocations is based on one or more storage jobs that are assigned to each of the one or more agents, and wherein the one or more storage jobs are provided to the one or more agents;
   storing each of the data associated with the one or more storage jobs in the one or more cache volumes;
   reducing the cache allocation for each of the agents based on the data stored for each agent;
   determining one or more depleted cache allocations and one or more non-depleted cache allocations based on one or more allocation metrics, wherein each of the depleted cache allocations has a remaining capacity that is less than a depletion threshold and each of the non-depleted cache allocations has a remaining capacity that is greater than a non-depletion threshold;
   in response to determining the one or more depleted cached allocations, disassociating one or more portions of the disassociated one or more tokens associated with the non-depleted cache allocations, wherein the one or more portions of the one or more disassociated tokens are associated with the one or more determined depleted cache allocations;
   in response to determining a recall for one or more reserved portions of the free space, recalling the one or more tokens associated with each cache allocation that represents the one or more recalled reserved portions of the free space, wherein the one or more storage jobs are queued at the one or more cache volumes to receive the one or more recalled tokens in turn; and
   storing other data associated with one or more other jobs in the one or more depleted cache allocations in the cache volumes, wherein the other data is stored in the reserved portion of the one or more cache volumes previously reserved for the one or more non-depleted cache allocations.

2. The method of claim 1, wherein storing the data associated with the one or more storage jobs, further comprises:
   determining one of the agents associated with the one or more storage jobs; and
   in response to a capacity of the determined cache allocation associated with the one of the agents being equal to or greater than an amount of the data associated with the one or more storage jobs, storing the data in the one or more cache volumes and consuming a portion of the one or more tokens associated with the determined cache allocation of the one of the agents based on the amount of the data.

3. The method of claim 1, wherein storing the data associated with the one or more storage jobs, further comprises:
   determining the one of the agents associated with the one or more storage jobs; and
   in response to the amount of the data associated with the one or more storage jobs exceeding a capacity of the determined cache allocation associated with the one of the agents, queuing the one or more storage jobs at the one or more cache volumes until additional free space is provided on the one or more cache volumes.

4. The method of claim 1, further comprising:
   in response to an aggregate total of the tokens associated with the one or more cache allocations falling below a threshold value, performing further actions, including:
      providing a recall message to each of the agents associated with a cache allocation that is associated with one or more un-consumed tokens;
      generating a token pool at the one or more cache volumes based on a recall of the one or more un-consumed tokens;
      in response to a number of tokens in the token pool exceeding a token pool threshold value, granting a portion of the tokens in the token pool to each of the agents, wherein the determined cache allocation for each of the agents is updated based on the portion of the tokens; and
      in response to the number of tokens in the token pool subceeds the token pool threshold value, storing the data associated with the one or more storage jobs in the one or more cache volumes, wherein a portion of the one or more un-consumed tokens in the token pool are consumed based on the data associated with the one or more stored storage jobs.

5. The method of claim 1, further comprising:
   providing one or more reclamation jobs that reclaim space on the one or more cache volumes based on moving cached data to one or more storage volumes; and
   in response to an amount of reclaimed space on the one or more cache volumes exceeding a threshold value, granting one or more other tokens associated with the reclaimed space to the one or more depleted cache allocations.

6. The method of claim 1, further comprising:
   determining a cache upper bound for each of the agents based on the determined cache allocation for each of the agents;
   determining a total reserved space for each of the agents based on one or more of the cache allocations for each of the agents, or a number of tokens issued from a token pool to each of the agents; and
   updating the one or more allocation metrics based on the cache upper bound and the total reserved space.

7. The method of claim 1, wherein reducing the cache allocation for each of the agents based on the data stored for each of the agents, further comprises:
   reserving space on the one or more cache volumes based on a number of the tokens associated with the one or more storage jobs; and
   in response to storing the data on the one or more cache volumes, performing further actions, including:
      committing the data associated with the one or more storage jobs when the data is stored on the one or more cache volumes; and
      reducing the cache allocation of each of the agents based on the data that is committed to the one or more cache volumes.

8. A processor readable non-transitory storage media that includes instructions for managing data in a file system over a network, wherein execution of the instructions by one or more processors on one or more network computers performs actions, comprising:
   providing the file system that includes one or more cache volumes and one or more agents that are associated with one or more clients of the file system;
   determining a cache allocation for each of the agents based on a capacity of the one or more cache volumes and a number of the one or more agents, wherein each of the cache allocations is associated with one or more tokens that each of the cache allocations represents a reserved portion of free space in the one or more cache volumes, and wherein distribution of each of the cache allocations is based on one or more storage jobs that are assigned to each of the one or more agents, and wherein the one or more storage jobs are provided to the one or more agents;
   storing each of the data associated with the one or more storage jobs in the one or more cache volumes;
   reducing the cache allocation for each of the agents based on the data stored for each agent;
   determining one or more depleted cache allocations and one or more non-depleted cache allocations based on one or more allocation metrics, wherein each of the depleted cache allocations has a remaining capacity that is less than a depletion threshold and each of the non-depleted cache allocations has a remaining capacity that is greater than a non-depletion threshold;
   in response to determining the one or more depleted cached allocations, disassociating one or more portions of the disassociated one or more tokens associated with the non-depleted cache allocations, wherein the one or more portions of the one or more disassociated tokens are associated with the one or more determined depleted cache allocations;
   in response to determining a recall for one or more reserved portions of the free space, recalling the one or more tokens associated with each cache allocation that represents the one or more recalled reserved portions of the free space, wherein the one or more storage jobs are queued at the one or more cache volumes to receive the one or more recalled tokens in turn; and
   storing other data associated with one or more other jobs in the one or more depleted cache allocations in the cache volumes, wherein the other data is stored in the reserved portion of the one or more cache volumes previously reserved for the one or more non-depleted cache allocations.

9. The processor readable non-transitory storage media of claim 8, wherein storing the data associated with the one or more storage jobs, further comprises:
   determining one of the agents associated with the one or more storage jobs; and
   in response to a capacity of the determined cache allocation associated with the one of the agents being equal to or greater than an amount of the data associated with the one or more storage jobs, storing the data in the one or more cache volumes and consuming a portion of the one or more tokens associated with the determined cache allocation of the one of the agents based on the amount of the data.

10. The processor readable non-transitory storage media of claim 8, wherein storing the data associated with the one or more storage jobs, further comprises:
    determining the one of the agents associated with the one or more storage jobs; and
    in response to the amount of the data associated with the one or more storage jobs exceeding a capacity of the determined cache allocation associated with the one of the agents, queuing the one or more storage jobs at the one or more cache volumes until additional free space is provided on the one or more cache volumes.

11. The processor readable non-transitory storage media of claim 8, further comprising:
    in response to an aggregate total of the tokens associated with the one or more cache allocations falling below a threshold value, performing further actions, including:
       providing a recall message to each of the agents associated with a cache allocation that is associated with one or more un-consumed tokens;
       generating a token pool at the one or more cache volumes based on a recall of the one or more un-consumed tokens;
       in response to a number of tokens in the token pool exceeding a token pool threshold value, granting a portion of the tokens in the token pool to each of the agents, wherein the determined cache allocation for each of the agents is updated based on the portion of the tokens; and
       in response to the number of tokens in the token pool subceeds the token pool threshold value, storing the data associated with the one or more storage jobs in the one or more cache volumes, wherein a portion of the one or more un-consumed tokens in the token pool are consumed based on the data associated with the one or more stored storage jobs.

12. The processor readable non-transitory storage media of claim 8, further comprising:
    providing one or more reclamation jobs that reclaim space on the one or more cache volumes based on moving cached data to one or more storage volumes; and
    in response to an amount of reclaimed space on the one or more cache volumes exceeding a threshold value, granting one or more other tokens associated with the reclaimed space to the one or more depleted cache allocations.

13. The processor readable non-transitory storage media of claim 8, further comprising:
  determining a cache upper bound for each of the agents based on the determined cache allocation for each of the agents;
  determining a total reserved space for each of the agents based on one or more of the cache allocations for each of the agents, or a number of tokens issued from a token pool to each of the agents; and
  updating the one or more allocation metrics based on the cache upper bound and the total reserved space.

14. The processor readable non-transitory storage media of claim 8, wherein reducing the cache allocation for each of the agents based on the data stored for each of the agents, further comprises:
  reserving space on the one or more cache volumes based on a number of the tokens associated with the one or more storage jobs; and
  in response to storing the data on the one or more cache volumes, performing further actions, including:
    committing the data associated with the one or more storage jobs when the data is stored on the one or more cache volumes; and
    reducing the cache allocation of each of the agents based on the data that is committed to the one or more cache volumes.

15. A network computer for managing data in a file system, comprising:
  a memory that stores at least instructions; and
  one or more processors that execute instructions that perform actions, including:
    providing the file system that includes one or more cache volumes and one or more agents that are associated with one or more clients of the file system;
    determining a cache allocation for each of the agents based on a capacity of the one or more cache volumes and a number of the one or more agents, wherein each of the cache allocations is associated with one or more tokens that each of the cache allocations represents a reserved portion of free space in the one or more cache volumes, and wherein distribution of each of the cache allocations is based on one or more storage jobs that are assigned to each of the one or more agents, and wherein the one or more storage jobs are provided to the one or more agents;
    storing each of the data associated with the one or more storage jobs in the one or more cache volumes;
    reducing the cache allocation for each of the agents based on the data stored for each agent;
    determining one or more depleted cache allocations and one or more non-depleted cache allocations based on one or more allocation metrics, wherein each of the depleted cache allocations has a remaining capacity that is less than a depletion threshold and each of the non-depleted cache allocations has a remaining capacity that is greater than a non-depletion threshold;
    in response to determining the one or more depleted cached allocations, disassociating one or more portions of the disassociated one or more tokens associated with the non-depleted cache allocations, wherein the one or more portions of the one or more disassociated tokens are associated with the one or more determined depleted cache allocations;
    in response to determining a recall for one or more reserved portions of the free space, recalling the one or more tokens associated with each cache allocation that represents the one or more recalled reserved portions of the free space, wherein the one or more storage jobs are queued at the one or more cache volumes to receive the one or more recalled tokens in turn; and
    storing other data associated with one or more other jobs in the one or more depleted cache allocations in the cache volumes, wherein the other data is stored in the reserved portion of the one or more cache volumes previously reserved for the one or more non-depleted cache allocations.

16. The network computer of claim 15, wherein storing the data associated with the one or more storage jobs, further comprises:
  determining one of the agents associated with the one or more storage jobs; and
  in response to a capacity of the determined cache allocation associated with the one of the agents being equal to or greater than an amount of the data associated with the one or more storage jobs, storing the data in the one or more cache volumes and consuming a portion of the one or more tokens associated with the determined cache allocation of the one of the agents based on the amount of the data.

17. The network computer of claim 15, wherein storing the data associated with the one or more storage jobs, further comprises:
  determining the one of the agents associated with the one or more storage jobs; and
  in response to the amount of the data associated with the one or more storage jobs exceeding a capacity of the determined cache allocation associated with the one of the agents, queuing the one or more storage jobs at the one or more cache volumes until additional free space is provided on the one or more cache volumes.

18. The network computer of claim 15, further comprising:
  in response to an aggregate total of the tokens associated with the one or more cache allocations falling below a threshold value, performing further actions, including:
    providing a recall message to each of the agents associated with a cache allocation that is associated with one or more un-consumed tokens;
    generating a token pool at the one or more cache volumes based on a recall of the one or more un-consumed tokens;
    in response to a number of tokens in the token pool exceeding a token pool threshold value, granting a portion of the tokens in the token pool to each of the agents, wherein the determined cache allocation for each of the agents is updated based on the portion of the tokens; and
    in response to the number of tokens in the token pool subceeds the token pool threshold value, storing the data associated with the one or more storage jobs in the one or more cache volumes, wherein a portion of the one or more un-consumed tokens in the token pool are consumed based on the data associated with the one or more stored storage jobs.

19. The network computer of claim 15, further comprising:
  providing one or more reclamation jobs that reclaim space on the one or more cache volumes based on moving cached data to one or more storage volumes; and
  in response to an amount of reclaimed space on the one or more cache volumes exceeding a threshold value, granting one or more other tokens associated with the reclaimed space to the one or more depleted cache allocations.

20. The network computer of claim 15, further comprising:
   determining a cache upper bound for each of the agents based on the determined cache allocation for each of the agents;
   determining a total reserved space for each of the agents based on one or more of the cache allocations for each of the agents, or a number of tokens issued from a token pool to each of the agents; and
   updating the one or more allocation metrics based on the cache upper bound and the total reserved space.

21. The network computer of claim 15, wherein reducing the cache allocation for each of the agents based on the data stored for each of the agents, further comprises:
   reserving space on the one or more cache volumes based on a number of the tokens associated with the one or more storage jobs; and
   in response to storing the data on the one or more cache volumes, performing further actions, including:
      committing the data associated with the one or more storage jobs when the data is stored on the one or more cache volumes; and
      reducing the cache allocation of each of the agents based on the data that is committed to the one or more cache volumes.

22. A system for managing data in a file system comprising:
   a network computer, comprising:
      a memory that stores at least instructions; and
      one or more processors that execute instructions that perform actions, including:
         providing the file system that includes one or more cache volumes and one or more agents that are associated with one or more clients of the file system;
         determining a cache allocation for each of the agents based on a capacity of the one or more cache volumes and a number of the one or more agents, wherein each of the cache allocations is associated with one or more tokens that each of the cache allocations represents a reserved portion of free space in the one or more cache volumes, and wherein distribution of each of the cache allocations is based on one or more storage jobs that are assigned to each of the one or more agents, and wherein the one or more storage jobs are provided to the one or more agents;
         storing each of the data associated with the one or more storage jobs in the one or more cache volumes;
         reducing the cache allocation for each of the agents based on the data stored for each agent;
         determining one or more depleted cache allocations and one or more non-depleted cache allocations based on one or more allocation metrics, wherein each of the depleted cache allocations has a remaining capacity that is less than a depletion threshold and each of the non-depleted cache allocations has a remaining capacity that is greater than a non-depletion threshold;
         in response to determining the one or more depleted cached allocations, disassociating one or more portions of the disassociated one or more tokens associated with the non-depleted cache allocations, wherein the one or more portions of the one or more disassociated tokens are associated with the one or more determined depleted cache allocations;
         in response to determining a recall for one or more reserved portions of the free space, recalling the one or more tokens associated with each cache allocation that represents the one or more recalled reserved portions of the free space, wherein the one or more storage jobs are queued at the one or more cache volumes to receive the one or more recalled tokens in turn; and
         storing other data associated with one or more other jobs in the one or more depleted cache allocations in the cache volumes, wherein the other data is stored in the reserved portion of the one or more cache volumes previously reserved for the one or more non-depleted cache allocations; and
   one or more client computers, comprising:
      a memory that stores at least instructions; and
      one or more processors that execute instructions that perform actions, including, providing one or more of the one or more storage jobs.

23. The system of claim 22, wherein storing the data associated with the one or more storage jobs, further comprises:
   determining one of the agents associated with the one or more storage jobs; and
   in response to a capacity of the determined cache allocation associated with the one of the agents being equal to or greater than an amount of the data associated with the one or more storage jobs, storing the data in the one or more cache volumes and consuming a portion of the one or more tokens associated with the determined cache allocation of the one of the agents based on the amount of the data.

24. The system of claim 22, wherein storing the data associated with the one or more storage jobs, further comprises:
   determining the one of the agents associated with the one or more storage jobs; and
   in response to the amount of the data associated with the one or more storage jobs exceeding a capacity of the determined cache allocation associated with the one of the agents, queuing the one or more storage jobs at the one or more cache volumes until additional free space is provided on the one or more cache volumes.

25. The system of claim 22, further comprising:
   in response to an aggregate total of the tokens associated with the one or more cache allocations falling below a threshold value, performing further actions, including:
      providing a recall message to each of the agents associated with a cache allocation that is associated with one or more un-consumed tokens;
      generating a token pool at the one or more cache volumes based on a recall of the one or more un-consumed tokens;
      in response to a number of tokens in the token pool exceeding a token pool threshold value, granting a portion of the tokens in the token pool to each of the agents, wherein the determined cache allocation for each of the agents is updated based on the portion of the tokens; and
      in response to the number of tokens in the token pool subceeds the token pool threshold value, storing the data associated with the one or more storage jobs in the one or more cache volumes, wherein a portion of the one or more un-consumed tokens in the token pool are consumed based on the data associated with the one or more stored storage jobs.

26. The system of claim 22, further comprising:
providing one or more reclamation jobs that reclaim space on the one or more cache volumes based on moving cached data to one or more storage volumes; and
in response to an amount of reclaimed space on the one or more cache volumes exceeding a threshold value, granting one or more other tokens associated with the reclaimed space to the one or more depleted cache allocations.

27. The system of claim 22, further comprising:
determining a cache upper bound for each of the agents based on the determined cache allocation for each of the agents;
determining a total reserved space for each of the agents based on one or more of the cache allocations for each of the agents, or a number of tokens issued from a token pool to each of the agents; and
updating the one or more allocation metrics based on the cache upper bound and the total reserved space.

28. The system of claim 22, wherein reducing the cache allocation for each of the agents based on the data stored for each of the agents, further comprises:
reserving space on the one or more cache volumes based on a number of the tokens associated with the one or more storage jobs; and
in response to storing the data on the one or more cache volumes, performing further actions, including:
committing the data associated with the one or more storage jobs when the data is stored on the one or more cache volumes; and
reducing the cache allocation of each of the agents based on the data that is committed to the one or more cache volumes.

\* \* \* \* \*